(12) United States Patent
Watanabe

(10) Patent No.: US 12,318,667 B2
(45) Date of Patent: Jun. 3, 2025

(54) MULTI-PIECE SOLID GOLF BALL

(71) Applicant: Bridgestone Sports Co. Ltd, Tokyo (JP)

(72) Inventor: Hideo Watanabe, Saitamaken (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 79 days.

(21) Appl. No.: 18/346,461

(22) Filed: Jul. 3, 2023

(65) Prior Publication Data

US 2024/0024737 A1    Jan. 25, 2024

(30) Foreign Application Priority Data

Jul. 19, 2022  (JP) ................................ 2022-114563

(51) Int. Cl.
| | |
|---|---|
| A63B 37/06 | (2006.01) |
| A63B 37/00 | (2006.01) |
| C08F 279/02 | (2006.01) |
| C08L 33/08 | (2006.01) |

(52) U.S. Cl.
CPC ...... *A63B 37/0084* (2013.01); *A63B 37/0047* (2013.01); *A63B 37/0063* (2013.01); *A63B 37/0064* (2013.01); *A63B 37/0068* (2013.01); *A63B 37/0076* (2013.01); *A63B 37/00922* (2020.08); *C08F 279/02* (2013.01); *C08L 33/08* (2013.01)

(58) Field of Classification Search
CPC .................. A63B 37/0076; A63B 37/0084
See application file for complete search history.

(56) References Cited

U.S. PATENT DOCUMENTS

| | | | |
|---|---|---|---|
| 6,419,595 B1 * | 7/2002 | Maruko | A63B 37/0033 473/371 |
| 10,441,853 B2 * | 10/2019 | Watanabe | A63B 37/0024 |
| 10,639,523 B2 * | 5/2020 | Watanabe | A63B 37/0076 |
| 10,653,922 B2 * | 5/2020 | Watanabe | A63B 37/0075 |

(Continued)

FOREIGN PATENT DOCUMENTS

| | | | | |
|---|---|---|---|---|
| JP | 2001321462 A | * | 11/2001 | ......... A63B 37/0004 |
| JP | 2001321463 A | * | 11/2001 | ......... A63B 37/0004 |

(Continued)

*Primary Examiner* — Alvin A Hunter
(74) *Attorney, Agent, or Firm* — Sughrue Mion, PLLC

(57) ABSTRACT

In a golf ball having a core, an envelope layer, an intermediate layer and a cover, the core is formed of a rubber composition and the envelope layer, the intermediate layer and the cover are each formed of a resin composition. The core, the envelope layer-encased sphere, the intermediate layer-encased sphere and the ball have respective initial velocities which together satisfy the following three conditions:

(initial velocity of ball)<(initial velocity of intermediate layer-encased sphere), (initial velocity of intermediate layer-encased sphere)−(initial velocity of envelope layer-encased sphere)≤0.60 m/s, and 0.50≤(initial velocity of envelope layer-encased sphere)−(initial velocity of core)≤1.08 m/s.

This golf ball can achieve a superior distance on shots with a utility club and with irons, and exhibits a good durability to repeated impact, a good controllability in the short game and a good feel at impact.

11 Claims, 4 Drawing Sheets

(56) References Cited

U.S. PATENT DOCUMENTS

| | | | |
|---|---|---|---|
| 10,758,786 B2* | 9/2020 | Watanabe | B32B 27/36 |
| 10,765,917 B2* | 9/2020 | Watanabe | A63B 37/0065 |
| 10,773,130 B2* | 9/2020 | Watanabe | A63B 37/0087 |
| 10,946,251 B2* | 3/2021 | Watanabe | A63B 37/0065 |
| 10,953,287 B2* | 3/2021 | Watanabe | A63B 37/0018 |
| 10,953,288 B2* | 3/2021 | Watanabe | A63B 37/0018 |
| 10,967,226 B2* | 4/2021 | Watanabe | A63B 37/0045 |
| 10,967,228 B2* | 4/2021 | Watanabe | A63B 37/00621 |
| 10,987,548 B2* | 4/2021 | Watanabe | A63B 37/0076 |
| 11,027,174 B2* | 6/2021 | Watanabe | A63B 37/0051 |
| 11,103,753 B2* | 8/2021 | Watanabe | A63B 37/0043 |
| 11,179,606 B1* | 11/2021 | Watanabe | A63B 37/00222 |
| 11,202,938 B2* | 12/2021 | Watanabe | A63B 37/0033 |
| 11,202,939 B2* | 12/2021 | Watanabe | A63B 37/0039 |
| 11,291,887 B2* | 4/2022 | Watanabe | A63B 37/0092 |
| 11,358,034 B2* | 6/2022 | Watanabe | A63B 37/00222 |
| 11,376,477 B2* | 7/2022 | Watanabe | A63B 37/0043 |
| 11,389,701 B2* | 7/2022 | Watanabe | A63B 37/0031 |
| 11,607,587 B2* | 3/2023 | Watanabe | A63B 37/0065 |
| 11,642,572 B2* | 5/2023 | Watanabe | A63B 37/0065 473/351 |
| 11,642,574 B2* | 5/2023 | Watanabe | A63B 37/0075 473/374 |
| 11,654,335 B2* | 5/2023 | Watanabe | A63B 37/0076 473/371 |
| 11,911,665 B2* | 2/2024 | Watanabe | A63B 37/0075 |
| 11,938,378 B2* | 3/2024 | Watanabe | A63B 37/0047 |
| 2007/0281802 A1 | 12/2007 | Watanabe et al. | |
| 2007/0287557 A1 | 12/2007 | Watanabe et al. | |
| 2008/0102987 A1 | 5/2008 | Watanabe et al. | |
| 2009/0111610 A1 | 4/2009 | Watanabe et al. | |
| 2014/0194221 A1* | 7/2014 | Watanabe | A63B 37/0033 473/376 |
| 2015/0258388 A1* | 9/2015 | Watanabe | A63B 37/0047 473/373 |
| 2016/0008667 A1* | 1/2016 | Watanabe | A63B 37/0084 473/376 |
| 2016/0151677 A1* | 6/2016 | Watanabe | A63B 37/0076 473/367 |
| 2016/0151679 A1* | 6/2016 | Watanabe | C08K 5/098 473/376 |
| 2016/0175661 A1* | 6/2016 | Watanabe | A63B 37/0084 473/376 |

FOREIGN PATENT DOCUMENTS

| | | | | |
|---|---|---|---|---|
| JP | 2007-319667 A | | 12/2007 | |
| JP | 2007-330789 A | | 12/2007 | |
| JP | 2008-068077 A | | 3/2008 | |
| JP | 2009-095358 A | | 5/2009 | |
| JP | 2009-095364 A | | 5/2009 | |
| JP | 2012-071163 A | | 4/2012 | |
| JP | 2014-132955 A | | 7/2014 | |
| JP | 2016-116627 A | | 6/2016 | |
| JP | 2016101254 A | * | 6/2016 | A63B 37/0039 |
| JP | 2016101256 A | * | 6/2016 | A63B 37/004 |

* cited by examiner

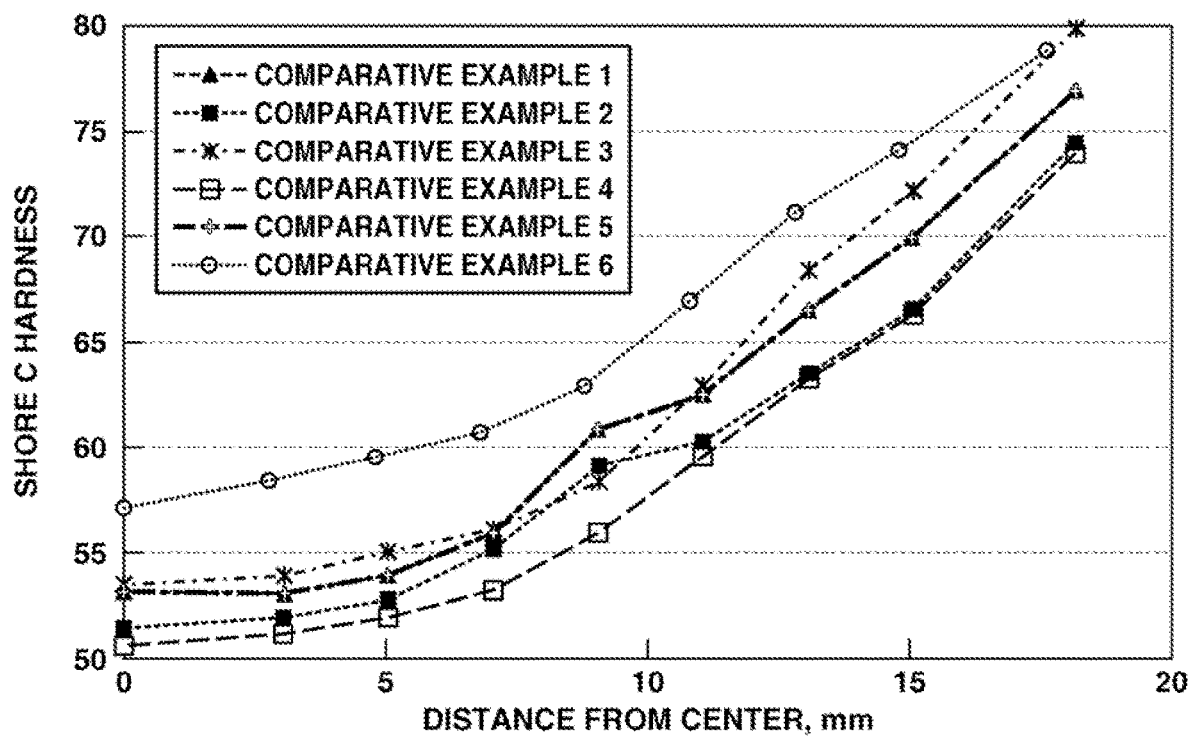

MULTI-PIECE SOLID GOLF BALL

CROSS-REFERENCE TO RELATED APPLICATIONS

This non-provisional application claims priority under 35 U.S.C. § 119(a) on Patent Application No. 2022-114563 filed in Japan on Jul. 19, 2022, the entire contents of which are hereby incorporated by reference.

TECHNICAL FIELD

The present invention relates to a multi-piece solid golf ball of four or more layers that has a core, an envelope layer, an intermediate layer and a cover.

BACKGROUND ART

Many innovations have been made in designing golf balls with a multilayer construction, and numerous balls that satisfy the needs of not only professional golfers, but also ordinary amateur golfers—ranging from beginners to skilled players—have been developed to date. For example, functional multi-piece solid golf balls in which the material hardnesses and surface hardnesses of the respective layers—i.e., the core, envelope layer, intermediate layer and cover (outermost layer)—have been optimized are in wide use. Also, a number of technical disclosures have been published which, by focusing on the hardness profile of the core that accounts for most of the ball volume and creating various core interior hardness designs, provide high-performance golf balls.

Examples of such technical literature include JP-A 2007-319667, JP-A 2007-330789, JP-A 2008-068077, JP-A 2009-095358, JP-A 2009-095364, JP-A 2012-071163, JP-A 2014-132955, JP-A 2016-101254, JP-A 2016-101256 and JP-A 2016-116627. These describe golf balls having a multilayer construction of four or more layers in which the surface hardnesses of the core, the intermediate layer-encased sphere and the ball have been optimized.

However, although the initial velocities of the core and encased spheres such as the envelope layer-encased sphere, intermediate layer-encased sphere and ball are disclosed for some of these prior-art golf balls, none are golf balls capable of achieving a superior distance on shots with utility clubs and irons and having also a good controllability on approach shots, a good feel at impact and excellent durability. Hence there exists, particularly among skilled amateur golfers whose head speed may not be all that fast but who have a low handicap, a desire for a golf ball which can achieve a superior distance on shots with a utility club and with irons.

SUMMARY OF THE INVENTION

It is therefore an object of the present invention to provide a golf ball which, when used by a skilled amateur golfer, achieves a superior distance on shots with a utility club and on shots with irons, has a good controllability on approach shots, and also has a good feel at impact and an excellent durability to repeated impact.

As a result of intensive investigations, I have found that, in a multi-piece solid golf ball having a core, an envelope layer, an intermediate layer and a cover, by having the relationships among the initial velocity of the core, the initial velocity of the envelope layer-encased sphere obtained by encasing the core with the envelope layer, the initial velocity of the intermediate layer-encased sphere obtained by encasing the envelope layer-encased sphere with the intermediate layer and the initial velocity of the ball obtained by encasing the intermediate layer-encased sphere with the cover satisfy the following three conditions:

(initial velocity of ball)<(initial velocity of intermediate layer-encased sphere), (initial velocity of intermediate layer-encased sphere)−(initial velocity of envelope layer-encased sphere)≤0.60 m/s, and 0.50≤(initial velocity of envelope layer-encased sphere)−(initial velocity of core)≤1.08 m/s, superior distances on shots with a utility club and on shots with irons when used by a skilled amateur golfer, good controllability on approach shots, a good feel at impact and excellent durability to repeated impact can all be obtained. As used herein, a "skilled amateur golfer" refers to an amateur golfer whose head speed is not as fast as that of a professional golfer, but who has a low handicap. The head speed of such a golfer on shots with a driver (W #1) is generally in the range of 35 to 44 m/s.

Accordingly, the invention provides a multi-piece solid golf ball having a core of one or more layer, one or more envelope layer, a single intermediate layer and a single-layer cover, wherein the core is formed of a rubber composition, the envelope layer, the intermediate layer and the cover are each formed of a resin composition, and the core has an initial velocity, the envelope layer-encased sphere obtained by encasing the core with the envelope layer has an initial velocity, the intermediate layer-encased sphere obtained by encasing the envelope layer-encased sphere with the intermediate layer has an initial velocity and the ball obtained by encasing the intermediate layer-encased sphere with the cover has an initial velocity which together satisfy the following three conditions:

(initial velocity of ball)<(initial velocity of intermediate layer-encased sphere), (initial velocity of intermediate layer-encased sphere)−(initial velocity of envelope layer-encased sphere)≤0.60 m/s, and 0.50≤(initial velocity of envelope layer-encased sphere)−(initial velocity of core)≤1.08 m/s.

In a preferred embodiment of the golf ball according to the invention, the ball satisfies the following condition:
Shore C surface hardness of ball<Shore C surface hardness of intermediate layer-encased sphere>Shore C surface hardness of envelope layer-encased sphere>Shore C surface hardness of core.

In another preferred embodiment of the inventive golf ball, the resin composition of the intermediate layer includes a high-acid ionomer resin having an acid content of 16 wt % or more.

In yet another preferred embodiment, the intermediate layer has a specific gravity of 1.05 or more.

In still another preferred embodiment, the intermediate layer includes a granular inorganic filler.

In a further preferred embodiment, the cover and the intermediate layer have respective specific gravities with a difference therebetween of not more than 0.15.

In a yet further preferred embodiment, the ball satisfies the following condition: thickness of cover<thickness of intermediate layer thickness of envelope layer.

In a still further preferred embodiment, the core has a diameter of from 35.1 to 41.3 mm.

In another preferred embodiment, the core has a hardness profile in which, letting Cc be the Shore C hardness at a center of the core, Cs be the Shore C hardness at a surface of the core, Cm be the Shore C hardness at a midpoint M between the core center and the core surface, Cm−2, Cm−4 and Cm−6 be the respective Shore C hardnesses at positions 2 mm, 4 mm and 6 mm inward from the midpoint M and Cm+2, Cm+4 and Cm+6 be the respective Shore C hardnesses at positions 2 mm, 4 mm and 6 mm outward from the midpoint M, and defining surface areas A to F as follows surface area A: ½×2×(Cm−4−Cm−6)
surface area B: ½×2×(Cm−2−Cm−4)
surface area C: ½×2×(Cm−Cm−2)
surface area D: ½×2×(Cm+2−Cm)
surface area E: ½×2×(Cm+4−Cm+2)
surface area F: ½×2×(Cm+6−Cm+4), the core satisfies the condition:

(surface area $E$+surface area $F$)−(surface area $A$+surface area $B$)≤1.0.

In a further preferred embodiment, the ball satisfies the following condition:

1.00 (initial velocity of intermediate layer-encased sphere)−(initial velocity of core)≤1.65 m/s.

Advantageous Effects of the Invention

The golf ball of the invention can achieve a superior distance on full shots with a utility club and with irons by, primarily, skilled amateur golfers whose head speeds are not all that fast but who have a low handicap. In addition, the inventive golf ball has a high spin rate on approach shots and thus an excellent playability in the short game. Moreover, this golf ball has a good, soft feel at impact on all shots and also has a good durability to repeated impact

BRIEF DESCRIPTION OF THE DRAWINGS

FIG. 4 is a graph showing the core hardness profiles in Comparative Examples 1 to 6.

DETAILED DESCRIPTION OF THE INVENTION

The objects, features and advantages of the invention will become more apparent from the following detailed description taken in conjunction with the appended diagrams.

Figure 1:
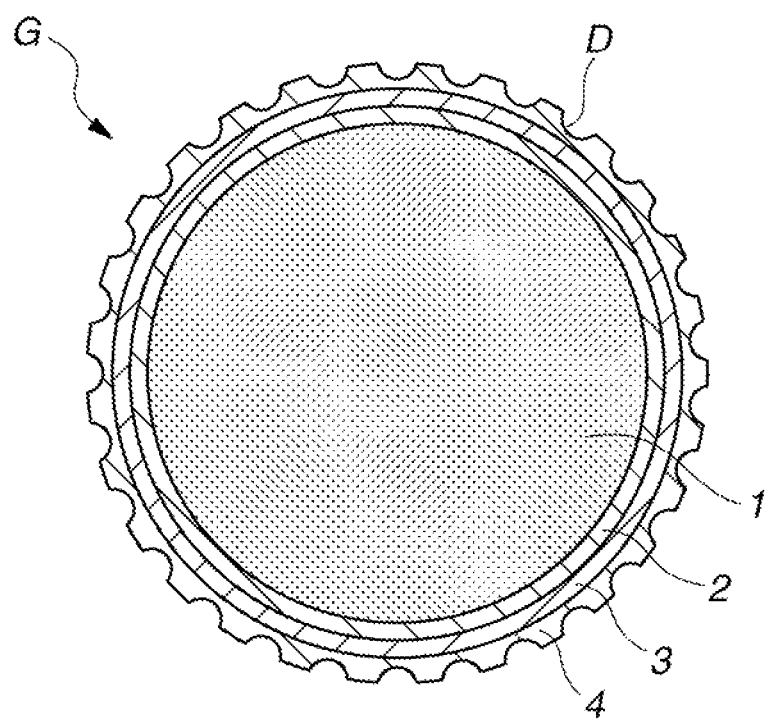
FIG. 1 is a schematic cross-sectional view of a golf ball according to one embodiment of the invention.

Referring to FIG. 1, the multi-piece solid golf ball of the invention is a golf ball G of four or more layers which has a core 1, an envelope layer 2 encasing the core 1, an intermediate layer 3 encasing the envelope layer 2, and a cover 4 encasing the intermediate layer 3. Numerous dimples D are typically formed on the surface of the cover 4. Although not shown in the diagram, a coating is generally painted onto the surface of the cover 4. Aside from the coating layer thus formed, the cover 4 is positioned as the outermost layer in the layered construction of the golf ball. The core 1 and the envelope layer 2 are not limited to single layers and may each be formed as two or more layers. However, the intermediate layer 3 and the cover 4 are each formed as a single layer.

The core is obtained by vulcanizing a rubber composition composed primarily of a rubber material. When the core material is not a rubber composition, the core rebound is low, as a result of which the ball may not travel far. This rubber composition is typically obtained by using a base rubber as the chief ingredient and compounding together with this other ingredients such as a co-crosslinking agent, a crosslinking initiator, an inert filler and an organosulfur compound.

It is preferable to use polybutadiene as the base rubber. A commercial product may be used as the polybutadiene. Illustrative examples include BR01, BR51 and BR730 (all from JSR Corporation). The proportion of polybutadiene within the base rubber is preferably at least 60 wt %, and more preferably at least 80 wt %. Rubber ingredients other than the above polybutadiene may be included in the base rubber, provided that doing so does not detract from the advantageous effects of the invention. Examples of rubber ingredients other than the above polybutadiene include other polybutadienes and also other diene rubbers, such as styrene-butadiene rubbers, natural rubbers, isoprene rubbers and ethylene propylene-diene rubbers.

The co-crosslinking agent is an α,β-unsaturated carboxylic acid and/or a metal salt thereof. Specific examples of unsaturated carboxylic acids include acrylic acid, methacrylic acid, maleic acid and fumaric acid. The use of acrylic acid or methacrylic acid is especially preferred. Metal salts of unsaturated carboxylic acids include, without particular limitation, the above unsaturated carboxylic acids that have been neutralized with desired metal ions. Specific examples include the zinc salts and magnesium salts of methacrylic acid and acrylic acid. The use of zinc acrylate is especially preferred.

The unsaturated carboxylic acid and/or metal salt thereof is included in an amount, per 100 parts by weight of the base rubber, which is typically least 5 parts by weight, preferably at least 9 parts by weight, and more preferably at least 13 parts by weight. The amount included is typically not more than 60 parts by weight, preferably not more than 50 parts by weight, and more preferably not more than 40 parts by weight. Too much may make the core too hard, giving the ball an unpleasant feel at impact, whereas too little may lower the rebound.

It is suitable to use an organic peroxide as the crosslinking initiator. A commercially available organic peroxide may be used for this purpose. Examples of such products that may be suitably used include Percumyl D, Perhexa C-40 and Perhexa 3M (all from NOF Corporation), and Luperco 231XL (from AtoChem Co.). One of these may be used alone, or two or more may be used together. The amount of organic peroxide included per 100 parts by weight of the base rubber is preferably at least 0.1 part by weight, more preferably at least part by weight, and even more preferably at least 0.5 part by weight. The upper limit is preferably not more than 5 parts by weight, more preferably not more than 4 parts by weight, even more preferably not more than 3 parts by weight, and most preferably not more than 2.5 parts by weight. When too much or too little is included, it may not be possible to obtain a golf ball having a good feel, durability and rebound.

Fillers that may be suitably used include, for example, zinc oxide, barium sulfate and calcium carbonate. One of these may be used alone, or two or more may be used together. The amount of inert filler included per 100 parts by weight of the base rubber is preferably at least 1 part by weight, and more preferably at least 3 parts by weight. The upper limit per 100 parts by weight of the base rubber is preferably not more than 50 parts by weight, more preferably not more than 40 parts by weight, and even more preferably not more than 30 parts by weight. Too much or too little inert filler may make it impossible to obtain a proper weight and a suitable rebound.

Commercial products such as Nocrac NS-6, Nocrac NS-30, Nocrac 200 and Nocrac MB (all available from Ouchi Shinko Chemical Industry Co., Ltd.) may be used as antioxidants. One of these may be used alone, or two or more may be used together.

The amount of antioxidant included per 100 parts by weight of the base rubber, although not particularly limited, is preferably at least 0.05 part by weight, and more preferably at least 0.1 part by weight. The upper limit is preferably not more than 1.0 part by weight, more preferably not more than 0.7 part by weight, and even more preferably not more than 0.5 part by weight. Too much or too little antioxidant may make it impossible to achieve a suitable core hardness gradient and a suitable rebound, durability and spin rate-lowering effect on full shots.

In addition, an organosulfur compound may be included in the rubber composition so as to impart an excellent rebound. Specifically, it is recommended that thiophenols, thionaphthols, halogenated thiophenols or metal salts of these be included. Specific examples include pentachlorothiophenol, pentafluorothiophenol, pentabromothiophenol, p chlorothiophenol, the zinc salt of pentachlorothiophenol, and any of the following having 2 to 4 sulfur atoms: diphenylpolysulfides, dibenzylpolysulfides, dibenzoylpolysulfides, dibenzothiazoylpolysulfides and dithiobenzoylpolysulfides. The use of diphenyldisulfide or the zinc salt of pentachlorothiophenol is especially preferred.

The organosulfur compound is included in an amount per 100 parts by weight of the base rubber that is preferably not more than 5 parts by weight, more preferably not more than 4 parts by weight, even more preferably not more than 3 parts by weight, and most preferably not more than 2 parts by weight. Including too much organosulfur compound may make the hardness too low. On the other hand, including too little may make a rebound-improving effect unlikely.

Water may be included in the rubber composition. This water, although not particularly limited, may be distilled water or tap water. The use of distilled water that is free of impurities is especially suitable. The amount of water included per 100 parts by weight of the base rubber is preferably at least 0.1 part by weight, and more preferably at least 0.2 part by weight. The upper limit is preferably not more than 2 parts by weight, and more preferably not more than 1.5 parts by weight.

Decomposition of the organic peroxide within the core formulation can be promoted by the direct addition of water or a water-containing material to the core material. The decomposition efficiency of the organic peroxide within the core-forming rubber composition is known to change with temperature; starting at a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to the build-up of heat of decomposition by the organic peroxide which has decomposed from the outside, becomes considerably higher than the mold temperature. In cases where water or a water-containing material is added directly to the core, because the water acts to promote decomposition of the organic peroxide, radical reactions like those described above can be made to differ at the core center and core surface. That is, decomposition of the organic peroxide is further promoted near the center of the core, bringing about greater radical deactivation, which leads to a further decrease in the amount of active radicals. As a result, it is possible to obtain a core in which the crosslink densities at the core center and the core surface differ markedly.

The core can be produced by vulcanizing and curing the rubber composition containing the above ingredients. For example, the core can be produced by using a Banbury mixer, roll mill or other mixing apparatus to intensively mix the rubber composition, subsequently compression molding or injection molding the mixture in a core mold, and curing the resulting molded body by suitably heating it under conditions sufficient to allow the organic peroxide or co-crosslinking agent to act, such as at a temperature of between 100 and 200° C., preferably between 140 and 180° C., for 10 to 40 minutes.

In this invention, the core may be formed as a single layer or as a plurality of layers, although it is preferably formed as a single layer. When a rubber core composed of a plurality of layers is produced, in cases where the hardness difference at the interface between these rubber layers is large, layer separation at the interface may arise when the ball is repeatedly struck, possibly leading to a loss in the initial velocity of the ball on full shots.

The core has a diameter that is preferably at least 35.1 mm, more preferably at least 35.3 mm, and even more preferably at least 35.4 mm. The upper limit in the core diameter is preferably not more than 41.3 mm, more preferably not more than 39.2 mm, and even more preferably not more than 38.3 mm. When the core diameter is too small, the initial velocity of the ball may decrease or the deflection by the ball as a whole may become smaller, ultimately leading to a rise in the spin rate of the ball on full shots, as a result of which the intended distance may be unattainable. On the other hand, when the core diameter is too large, the spin rate on full shots may rise, likewise making the intended distance unattainable, or the durability to cracking on repeated impact may worsen.

The core has a deflection when compressed under a final load of 1,275 N (130 kgf) from an initial load of 98 N (10 kgf) which, although not particularly limited, is preferably at least 3.6 mm, more preferably at least 3.8 mm, and even more preferably at least 4.0 mm. The upper limit is preferably not more than 6.0 mm, more preferably not more than 5.7 mm, and even more preferably not more than 5.4 mm. When the core deflection is too small, i.e., when the core is too hard, the spin rate of the ball may rise excessively, resulting in a poor flight, or the feel at impact may become too hard. On the other hand, when the core deflection is too large, i.e., when the core is too soft, the ball rebound may become too low, resulting in a poor flight, the feel at impact may become too soft, or the durability to cracking on repeated impact may worsen.

Next, the hardness profile of the core is described. The core hardnesses mentioned below refer to Shore C hardnesses. These Shore C hardnesses are hardness values measured with a Shore C durometer in accordance with ASTM D2240.

The core center hardness Cc is preferably at least 45, more preferably at least 46, and even more preferably at least 47. The upper limit is preferably not more than 61, more preferably not more than 58, and even more preferably not more than 56. When this value is too large, the feel at impact may become hard or the spin rate on full shots may rise, as a result of which the intended distance may be unattainable. On the other hand, when this value is too small, the rebound may become low, resulting in a poor flight, or the durability to cracking on repeated impact may worsen.

The hardness Cm−6 at a position 6 mm inward from a midpoint M between the core center and the core surface, although not particularly limited, may be set to preferably at least 45, more preferably at least 47, and even more preferably at least 49. Although there is no particular upper limit, the hardness Cm−6 may be set to preferably not more than 61, more preferably not more than 59, and even more preferably not more than 57. Hardnesses that deviate from these values may lead to undesirable results similar to those described above for the core center hardness Cc.

The hardness Cm−4 at a position 4 mm inward from the midpoint M of the core, although not particularly limited, may be set to preferably at least 48, more preferably at least 50, and even more preferably at least 52. Although there is no particular upper limit, the hardness Cm−4 may be set to preferably not more than 62, more preferably not more than 60, and even more preferably not more than 58. Hardnesses that deviate from these values may lead to undesirable results similar to those described above for the core center hardness Cc.

The hardness Cm−2 at a position 2 mm inward from the midpoint M of the core, although not particularly limited, may be set to preferably at least 50, more preferably at least 52, and even more preferably at least 54. Although there is no particular upper limit, the hardness Cm−2 may be set to preferably not more than 64, more preferably not more than 62, and even more preferably not more than 60. Hardnesses that deviate from these values may lead to undesirable results similar to those described above for the core center hardness Cc.

The cross-sectional hardness Cm at the midpoint M of the core, although not particularly limited, may be set to preferably at least 53, more preferably at least 55, and even more preferably at least 57. Although there is no particular upper limit, the hardness Cm may be set to preferably not more than 68, more preferably not more than 65, and even more preferably not more than 62. Hardnesses that deviate from these values may lead to undesirable results similar to those described above for the core center hardness Cc.

The core surface hardness Cs is preferably at least 69, more preferably at least 71, and even more preferably at least 73. The upper limit is preferably not more than 87, more preferably not more than 85, and even more preferably not more than 83. When this value is too large, the durability to cracking on repeated impact may worsen or the feel at impact may become too hard. On the other hand, when this value is too small, the rebound may become small, resulting in a poor flight, or the spin rate on full shots may rise and the intended distance may be unattainable.

The hardness Cm+2 at a position 2 mm outward toward the core surface from the midpoint M of the core, although not particularly limited, may be set to preferably at least 57, more preferably at least 59, and even more preferably at least 61. Although there is no particular upper limit, the hardness Cm+2 may be set to preferably not more than 74, more preferably not more than 70, and even more preferably not more than 67. Hardnesses that deviate from these values may lead to undesirable results similar to those described above for the core surface hardness Cs.

The hardness Cm+4 at a position 4 mm outward from the midpoint M of the core, although not particularly limited, may be set to preferably at least 60, more preferably at least 62, and even more preferably at least 64. Although there is no particular upper limit, the hardness Cm+4 may be set to preferably not more than 77, more preferably not more than 73, and even more preferably not more than 71. Hardnesses that deviate from these values may lead to undesirable results similar to those described above for the core surface hardness Cs.

The hardness Cm+6 at a position 6 mm outward from the midpoint M of the core, although not particularly limited, may be set to preferably at least 63, more preferably at least 65, and even more preferably at least 67. Although there is no particular upper limit, the hardness Cm+6 may be set to preferably not more than 81, more preferably not more than 79, and even more preferably not more than 77. Hardnesses that deviate from these values may lead to undesirable results similar to those described above for the core surface hardness Cs.

In the above-described core hardness profile in this invention, the surface areas A to F defined as follows:

surface area A: $\frac{1}{2} \times 2 \times (Cm-4-Cm-6)$
surface area B: $\frac{1}{2} \times 2 \times (Cm-2-Cm-4)$
surface area C: $\frac{1}{2} \times 2 \times (Cm-Cm-2)$
surface area D: $\frac{1}{2} \times 2 \times (Cm+2-Cm)$
surface area E: $\frac{1}{2} \times 2 \times (Cm+4-Cm+2)$
surface area F: $\frac{1}{2} \times 2 \times (Cm+6-Cm+4)$, are characterized in that the value of (surface area E+surface area F)−(surface area A+surface area B) is preferably 1.0 or more, more preferably 2.0 or more, and even more preferably 4.0 or more, and the upper limit is preferably not more than 20.0, more preferably not more than 16.0, and even more preferably not more than 12.0. When this value is too large, the durability to cracking on repeated impact may worsen. On the other hand, when this value is too small, the spin rate of the ball on full shots may rise and the intended distance may be unattainable.

The value of (surface area D+surface area E)−(surface area B+surface area C) is preferably 1.0 or more, more preferably 2.0 or more, and even more preferably 3.0 or more, and the upper limit is preferably not more than 20.0, more preferably not more than 16.0, and even more preferably not more than 12.0. When this value is too large, the durability to cracking on repeated impact may worsen. On the other hand, when this value is too small, the spin rate of the ball on full shots may rise and the intended distance may be unattainable.

Surface areas A to F preferably satisfy the condition surface area *A*<surface area *C*<(surface area *E*+surface area *F*) and also the condition surface area *B*<surface area *C*<(surface area *E*+surface area *F*); and more preferably satisfy the condition surface area *A*<surface area *C*<surface area *D*<(surface area *E*+surface area *F*) and also the condition surface area *B*<surface area *C*<surface area *D*<(surface area *E*+surface area *F*).

When these conditions are not satisfied, the spin rate of the ball on full shots may rise and the intended distance may be unattainable.

Figure 2:
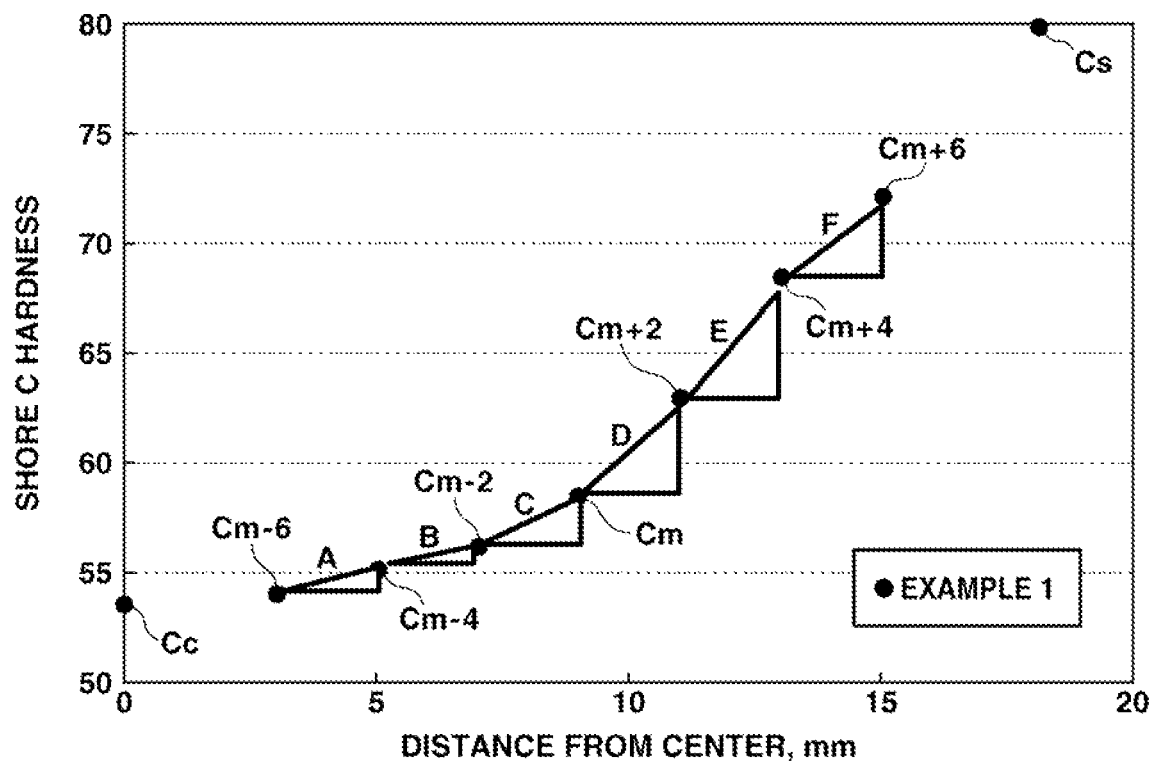
FIG. 2 is a graph that uses core hardness profile data from Example 1 in order to explain surface areas A to F in a core hardness profile.

FIG. 2 shows a graph that uses core hardness profile data from Example 1 to explain surface areas A to F. As is apparent from the graph, each of surface areas A to F is the surface area of a triangle whose base is the difference between specific distances from the core center and whose height is the difference in hardness between the positions at these specific distances.

The core has an initial velocity of preferably at least 75.3 m/s, more preferably at least 75.7 m/s, and even more preferably at least 76.0 m/s. The upper limit is preferably not more than 77.0 m/s, more preferably not more than 76.7 m/s, and even more preferably not more than 76.4 m/s. When the core initial velocity is too high, the ball initial velocity may become too high and ultimately fall outside the range specified in the Rules of Golf. On the other hand, when the core initial velocity is too low, the ball rebound on full shots may become low or the spin rate may rise, as a result of which the intended distance may be unattainable. The initial velocity value in this case is a numerical value measured with a COR-type initial velocity tester designed and built according to R&A (The Royal & Ancient Golf Club of St. Andrews) protocols. Specifically, a COR-type initial velocity tester produced by Hye Precision Products (U.S.A.) is used. The conditions at the time of measurement involve changing the air pressure in four stages and taking measurements, establishing a relationship between the inbound velocity and the coefficient of restitution (COR), and determining the initial velocity at an inbound velocity of 43.83 m/s from this relationship. Regarding the measurement environment of the COR-type initial velocity tester, measurements are carried out at a room temperature of 23.9±2° C. using a ball that has been temperature-conditioned for at least 3 hours in a thermostatic chamber adjusted to 23.9±1° C.

Next, the envelope layer is described.

The envelope layer has a material hardness which is not particularly limited. The material hardness on the Shore C hardness scale is preferably at least 72, more preferably at least 75 and even more preferably at least 78, but is preferably not more than 92, more preferably not more than 90 and even more preferably not more than 88. The material hardness on the Shore D hardness scale is preferably at least 47, more preferably at least 49 and even more preferably at least 51, but is preferably not more than 62, more preferably not more than 60 and even more preferably not more than 57.

The sphere obtained by encasing the core with the envelope layer (envelope layer encased sphere) has a surface hardness which, on the Shore C hardness scale, is preferably at least 80, more preferably at least 83 and even more preferably at least 86, but is preferably not more than 97, more preferably not more than 95 and even more preferably not more than 93. The surface hardness on the Shore D hardness scale is preferably at least 53, more preferably at least 55 and even more preferably at least 57, but is preferably not more than 68, more preferably not more than 66 and even more preferably not more than 63.

When the material hardness and surface hardness of the envelope layer are softer than the above ranges, the ball may be too receptive to spin on full shots or the initial velocity may decrease, resulting in a poor distance. On the other hand, when the material hardness and surface hardness of the envelope layer are higher than the above ranges, the feel of the ball at impact may become hard, the durability to cracking on repeated impact may worsen, or the spin rate on full shots may rise, as a result of which a good distance may not be obtained.

The envelope layer has a thickness which is preferably at least 0.8 mm, more preferably at least 1.0 mm, and even more preferably at least 1.2 mm. The upper limit in the envelope layer thickness is preferably not more than 2.0 mm, more preferably not more than 1.8 mm, and even more preferably not more than 1.7 mm. When the envelope layer is too thin, the spin rate-lowering effect on full shots may be inadequate and the intended distance may be unattainable. When the envelope layer is too thick, the initial velocity of the overall ball may decrease and the initial velocity on shots may become too low, as a result of which the intended distance may not unattainable.

The envelope layer thickness preferably satisfies the following condition in the thickness relationship with the subsequently described intermediate layer:
(intermediate layer thickness)≤(envelope layer thickness),
and more preferably satisfies the following condition:
(intermediate layer thickness)<(envelope layer thickness).

The envelope layer material is not particularly limited, although a known resin may be used for this purpose. Examples of especially preferred materials include resin compositions formulated from:
a base resin of (a) an olefin-unsaturated carboxylic acid random copolymer and/or a metal ion neutralization product of an olefin-unsaturated carboxylic acid random copolymer blended with (b) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and
(c) a non-ionomeric thermoplastic elastomer
in a weight ratio between 100:0 and 0:100.

The intermediate layer-forming resin material described in, for example, JP-A 2010-253268 may be suitably used as above components (a) to (c).

Depending on the intended use, optional additives may be suitably included in the above resin material. For example, pigments, dispersants, antioxidants, ultraviolet absorbers and light stabilizers may be added. When these additives are included, the amount added per 100 parts by weight of the overall base resin is preferably at least 0.1 part by weight, and more preferably at least 0.5 part by weight. The upper limit is preferably not more than 10 parts by weight, and more preferably not more than 4 parts by weight.

A granular inorganic filler may be included in the above resin material. Examples of granular inorganic fillers that may be suitably used include, without particular limitation, zinc oxide, barium sulfate and titanium dioxide. To obtain an excellent durability to cracking on repeated impact, the use of barium sulfate is preferred, with the use of precipitated barium sulfate being especially preferred.

The granular inorganic filler has an average particle size which, although not particularly limited, is set to preferably from 0.01 to 100 μm, and more preferably from 0.1 to 10 μm. When the average particle size of the granular inorganic filler is too small or too large, the dispersibility during preparation of the material may worsen. As used herein, "average particle size" refers to the particle size obtained by dispersing the granular inorganic filler in an aqueous solution together with a suitable dispersant and carrying out measurement with a particle size analyzer.

The content of the granular inorganic filler is not particularly limited, although addition in an amount of not more than 30 parts by weight per 100 parts by weight of the base resin of the envelope layer material is suitable. The envelope layer has a specific gravity that is preferably within the range of 0.95 to 1.25.

The envelope layer-encased sphere has an initial velocity which is preferably at least 76.0 m/s, more preferably at least 76.5 m/s and even more preferably at least 77.0 m/s, but is preferably not more than 78.0 m/s, more preferably not more than 77.7 m/s and even more preferably not more than 77.5 m/s. When this initial velocity is too high, the ball initial velocity may become too high and fall outside the range specified in the Rules of Golf. On the other hand, when this initial velocity is too low, the ball rebound on full shots may become low or the spin rate may rise, as a result of which the intended distance may be unattainable. The initial velocity in this case is measured with the same device and under the same conditions as described above for measurement of the core initial velocity.

Next, the intermediate layer is described.

The intermediate layer has a material hardness on the Shore C hardness scale which, although not particularly limited, is preferably at least 90, more preferably at least 92 and even more preferably at least 93, but is preferably not more than 100, more preferably not more than 98 and even more preferably not more than 96. The material hardness on the Shore D hardness scale is preferably at least 64, more preferably at least 66 and even more preferably at least 68, but is preferably not more than 75, more preferably not more than 72 and even more preferably not more than 70.

The sphere obtained by encasing the envelope layer-encased sphere with the intermediate layer (intermediate layer-encased sphere) has a surface hardness which, on the Shore C hardness scale, is preferably at least 95, more preferably at least 96, and even more preferably at least 97. The upper limit is preferably not more than 100, more preferably not more than 99, and even more preferably not more than 98. The surface hardness on the Shore D hardness scale is preferably at least 68, more preferably at least 69, and even more preferably at least 70. The upper limit is preferably not more than 78, more preferably not more than 75, and even more preferably not more than 72.

When the material and surface hardnesses of the intermediate layer are lower than the above ranges, the spin rate of the ball on full shots may rise excessively, resulting in a poor distance, or the initial velocity may become low, likewise resulting in a poor distance. On the other hand, when the material and surface hardnesses of the intermediate layer are higher than the above ranges, the durability to cracking on repeated impact may worsen or the feel at impact on shots with a putter or on short approaches may become too hard.

The intermediate layer has a thickness which is preferably at least 0.7 mm, more preferably at least 0.8 mm, and even more preferably at least 1.0 mm. The intermediate layer thickness has an upper limit that is preferably not more than 1.8 mm, more preferably not more than 1.4 mm, and even more preferably not more than 1.2 mm. It is preferable for the intermediate layer to be thicker than the subsequently described cover. When the intermediate layer thickness falls outside of the above range or the intermediate layer is thinner than the cover, the ball spin rate-lowering effect on shots with a driver (W #1) may be inadequate, resulting in a poor distance. Also, when the intermediate layer is too thin, the durability to cracking on repeated impact and the low-temperature durability may worsen.

It is preferable to use an ionomer resin as the chief material in the intermediate layer material.

The ionomer resin material preferably includes a high-acid ionomer resin having an unsaturated carboxylic acid content (also referred to below as the "acid content") of at least 16 wt %.

The amount of high-acid ionomer resin included per 100 wt % of the resin material is preferably at least 20 wt %, more preferably at least 30 wt %, and even more preferably at least 60 wt %. The upper limit is preferably 100 wt % or less, more preferably 90 wt % or less, and even more preferably 85 wt % or less. When the content of this high-acid ionomer resin is too low, the spin rate of the ball on full shots may rise and a good distance may not be attained. On the other hand, when the content of this high-acid ionomer resin is too high, the durability to repeated impact may worsen.

In cases where an ionomer resin is employed as the chief material, an embodiment that uses in admixture a zinc-neutralized ionomer resin and a sodium-neutralized ionomer resin as the chief material is desirable. The blending ratio therebetween, expressed as the weight ratio of zinc-neutralized ionomer to sodium-neutralized ionomer, is from 5/95 to 95/5, preferably from 10/90 to 90/10, and more preferably from 15/85 to 85/15. When the zinc-neutralized ionomer and sodium-neutralized ionomer are not included in a ratio within this range, the rebound may become too low and the desired distance may be unattainable, the durability to cracking on repeated impact at normal temperatures may worsen, or the durability to cracking at low temperatures (subzero Centigrade) may worsen.

Depending on the intended use, optional additives may be suitably included in the intermediate layer material. For example, pigments, dispersants, antioxidants, ultraviolet absorbers and light stabilizers may be added. When these additives are included, the amount added per 100 parts by weight of the base resin is preferably at least 0.1 part by weight, and more preferably at least 0.5 part by weight. The upper limit is preferably not more than 10 parts by weight, and more preferably not more than 4 parts by weight.

It is desirable to abrade the surface of the intermediate layer in order to increase adhesion of the intermediate layer material with the polyurethane that is preferably used in the subsequently described cover material. In addition, it is desirable to apply a primer (adhesive) to the surface of the intermediate layer following such abrasion treatment or to add an adhesion reinforcing agent to the intermediate layer material.

A granular inorganic filler may be included in the intermediate layer material. Examples of granular inorganic fillers that may be suitably used include, without particular limitation, zinc oxide, barium sulfate and titanium dioxide. To obtain an excellent durability to cracking on repeated impact, the use of barium sulfate is preferred, with the use of precipitated barium sulfate being especially preferred.

The granular inorganic filler has an average particle size which, although not particularly limited, is set to preferably from 0.01 to 100 µm, and more preferably from 0.1 to 10 µm. When the average particle size of the granular inorganic filler is too small or too large, the dispersibility during preparation of the material may worsen. As used herein, "average particle size" refers to the particle size obtained by dispersing the granular inorganic filler in an aqueous solution together with a suitable dispersant and carrying out measurement with a particle size analyzer.

The content of the granular inorganic filler is not particularly limited, although the content is preferably set to at least 0 part by weight, more preferably at least 10 parts by weight, and even more preferably at least 15 parts, per 100 parts by weight of the base resin of the intermediate layer material. Although there is no particular upper limit, the content is preferably not more than 50 parts by weight, more preferably not more than 40 parts by weight, and even more preferably not more than 30 parts by weight. At a granular inorganic filler content that is too low, the durability to cracking on repeated impact may worsen. On the other hand, at a granular inorganic filler content that is too high, the ball rebound may decrease or the spin rate of the ball on full shots may rise, as a result of which the intended distance may not be achieved.

The intermediate layer has a specific gravity which is preferably at least 1.05, more preferably at least 1.07, and even more preferably at least 1.09. The upper limit is preferably not more than 1.25, more preferably not more than 1.20, and even more preferably not more than 1.15. When the specific gravity of the intermediate layer is too small, the durability to cracking on repeated impact may worsen. On the other hand, when the specific gravity is too large, the ball rebound may decrease or the spin rate of the ball on full shots may rise, as a result of which the intended distance may not be achieved.

The intermediate layer-encased sphere has an initial velocity which is preferably at least 77.0 m/s, more preferably at least 77.4 m/s, and even more preferably at least 77.7 m/s. The upper limit is preferably not more than 78.5 m/s, more preferably not more than 78.2 m/s, and even more preferably not more than 77.9 m/s. When this initial velocity is too high, the ball initial velocity may become too high and end up falling outside the range specified in the Rules of Golf. On the other hand, when this initial velocity is too low, the ball rebound on full shots may become low or the spin rate may rise, as a result of which the intended distance may be unattainable. The initial velocity in this case is measured with the same device and under the same conditions as described above for measurement of the initial velocities of the core and the envelope layer-encased sphere.

Next, the cover is described.

The cover has a material hardness on the Shore C hardness scale which, although not particularly limited, is preferably at least 50, more preferably at least 57 and even more preferably at least 63, but is preferably not more than 80, more preferably not more than 74 and even more preferably not more than 70. The material hardness on the Shore D hardness scale is preferably at least 30, more preferably at least 35 and even more preferably at least 40, but is preferably not more than 53, more preferably not more than 50 and even more preferably not more than 47.

The sphere obtained by encasing the intermediate layer-encased sphere with the cover—that is, the ball—has a surface hardness which, on the Shore C hardness scale, is preferably at least 73, more preferably at least 78 and even more preferably at least 83, but is preferably not more than 95, more preferably not more than 92 and even more preferably not more than 90. The surface hardness on the Shore D hardness scale is preferably at least 50, more preferably at least 53 and even more preferably at least 56, but is preferably not more than 70, more preferably not more than 65 and even more preferably not more than 60. When the material hardness and surface hardness of the cover are lower than the above respective ranges, the spin rate of the ball on full shots may rise and a good distance may not be achieved. On the other hand, when the material hardness and surface hardness of the cover are too high, the ball may not be receptive to spin on approach shots or the scuff resistance may worsen.

The cover has a thickness of preferably at least 0.3 mm, more preferably at least 0.45 mm, and even more preferably at least 0.6 mm. The upper limit in the cover thickness is preferably not more than 1.2 mm, more preferably not more than 0.9 mm, and even more preferably not more than 0.8 mm. When the cover is too thick, the rebound of the ball on full shots may be inadequate or the spin rate may rise, as a result of which a good distance may not be achieved. On the other hand, when the cover is too thin, the scuff resistance may worsen or the ball may not be receptive to spin on approach shots and may thus lack sufficient controllability.

Various thermoplastic resins employed as cover stock in golf balls may be used as the cover material. For reasons having to do with the spin controllability of the ball in the short game and the scuff resistance, the use of a resin material composed primarily of a thermoplastic urethane is preferred. That is, the cover is preferably formed of a resin blend in which the main components are (I) a thermoplastic polyurethane and (II) a polyisocyanate compound.

It is recommended that the combined weight of components I and II be at least 60%, and preferably at least 70%, of the overall amount of the cover-forming resin composition. Components I and II are described in detail below.

The thermoplastic polyurethane (I) has a structure which includes soft segments composed of a polymeric polyol (polymeric glycol) that is a long-chain polyol and hard segments composed of a chain extender and a polyisocyanate compound. Here, the long chain polyol serving as a starting material may be any that has hitherto been used in the art relating to thermoplastic polyurethanes, and is not particularly limited. Illustrative examples include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly, or two or more may be used in combination. Of these, in terms of being able to synthesize a thermoplastic polyurethane having a high rebound resilience and excellent low-temperature properties, a polyether polyol is preferred.

Any chain extender that has hitherto been employed in the art relating to thermoplastic polyurethanes may be suitably used as the chain extender. For example, low-molecular-weight compounds with a molecular weight of 400 or less which have on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these, the chain extender is preferably an aliphatic diol having from 2 to 12 carbon atoms, and is more preferably 1,4-butylene glycol.

Any polyisocyanate compound hitherto employed in the art relating to thermoplastic polyurethanes may be suitably used without particular limitation as the polyisocyanate compound. For example, use may be made of one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. However, depending on the type of isocyanate, the crosslinking reactions during injection molding may be difficult to control. In the practice of the invention, to provide a balance between stability at the time of production and the properties that are manifested, it is most preferable to use the following aromatic diisocyanate: 4,4' diphenylmethane diisocyanate.

A commercially available product may be used as the thermoplastic polyurethane serving as component I. Illustrative examples include Pandex T-8295, Pandex T-8290 and Pandex T-8260 (all from DIC Covestro Polymer, Ltd.).

A thermoplastic elastomer other than the above thermoplastic polyurethanes may also be optionally included as a separate component, i.e., component III, together with above components I and II. By including this component III in the above resin blend, the flowability of the resin blend can be further improved and properties required of the golf ball cover material, such as resilience and scuff resistance, can be enhanced.

The compositional ratio of above components I, II and III is not particularly limited. However, to fully elicit the advantageous effects of the invention, the compositional ratio I:II:III is preferably in a weight ratio range of from 100:2:50 to 100:50:0, and more preferably in a range of from 100:2:50 to 100:30:8.

In addition, various additives other than the ingredients making up the above thermoplastic polyurethane may be optionally included in this resin blend. For example, pigments, dispersants, antioxidants, light stabilizers, ultraviolet absorbers and internal mold lubricants may be suitably included.

The cover has a specific gravity which, although not particularly limited, is preferably at least 1.00, more preferably at least 1.03, and even more preferably at least 1.06. The upper limit is preferably not more than 1.20, more preferably not more than 1.17, and even more preferably not more than 1.14. When the cover specific gravity is lower than the above range, the ratio of low specific gravity materials such as ionomer blended into the cover made chiefly of urethane ends up becoming high, as a result of which the scuff resistance may worsen. On the other hand, when the cover specific gravity is too high, the amount of filler added is high and the rebound may become too low, as a result of which the intended distance may be unattainable.

The manufacture of multi-piece solid golf balls in which the above-described core, envelope layer, intermediate layer and cover (outermost layer) are formed as successive layers may be carried out by a customary method such as a known injection molding process. For example, a multi-piece golf ball can be produced by successively injection molding the respective materials for the envelope layer and the intermediate layer over the core in injection molds for each layer so as to obtain the respective layer-encased spheres and then, last of all, injection-molding the material for the cover serving as the outermost layer over the intermediate layer-encased sphere. Alternatively, the encasing layers may each be formed by enclosing the sphere to be encased within two half-cups that have been pre-molded into hemispherical shapes and then molding under applied heat and pressure.

The golf ball has a deflection when compressed under a final load of 1,275 N (130 kgf) from an initial load of 98 N (10 kgf) which is preferably at least 2.7 mm, more preferably at least 2.9 mm, and even more preferably at least 3.0 mm. The deflection upper limit is preferably not more than 3.8 mm, more preferably not more than 3.6 mm, and even more preferably not more than 3.4 mm. When the golf ball deflection is too small, i.e., when the ball is too hard, the spin rate may rise excessively, resulting in a poor flight, or the feel at impact may be too hard. On the other hand, when the deflection is too large, i.e., when the ball is too soft, the ball rebound may be too low, resulting in a poor flight, the feel at impact may be too soft, or the durability to cracking under repeated impact may worsen.

The ball has an initial velocity which is preferably at least 76.8 m/s, more preferably at least 77.0 m/s, and even more preferably at least 77.2 m/s. The upper limit is preferably not more than 77.724 m/s. A ball initial velocity that is too high may fall outside the range specified in the Rules of Golf. On the other hand, when the ball initial velocity is too low, the ball may not travel well on full shots. The initial velocity in this case is measured with the same device and under the same conditions as described above for measurement of the initial velocities of the core, the envelope layer-encased sphere and the intermediate layer encased sphere.

Surface Hardness Relationships Among Spheres

The value obtained by subtracting the center hardness of the core from the surface hardness of the envelope layer-encased sphere, expressed on the Shore C hardness scale, is preferably 28 or more, more preferably 32 or more, and even more preferably 35 or more. The upper limit is preferably not more than 45, more preferably not more than 42, and even more preferably not more than 40. When this value is too small, the spin rate of the ball on full shots may rise and the intended distance may not be achieved. On the other hand, when this value is too large, the durability of the ball to cracking on repeated impact may worsen or the initial velocity on shots may become lower, as a result of which the intended distance may become unattainable.

The value obtained by subtracting the surface hardness of the core from the surface hardness of the envelope layer-encased sphere, expressed on the Shore C hardness scale, is preferably 1 or more, more preferably 4 or more, and even more preferably 8 or more. The upper limit is preferably not more than 25, more preferably not more than 20, and even more preferably not more than 18. When this value falls outside of the above range, the spin rate of the ball on full shots may rise and the intended distance may become unattainable.

The value obtained by subtracting the center hardness of the core from the surface hardness of the intermediate layer-encased sphere, expressed on the Shore C hardness scale, is preferably 40 or more, more preferably 41 or more, and even more preferably 42 or more. The upper limit is preferably not more than 53, more preferably not more than 50, and even more preferably not more than 47. When this value is too small, the spin rate of the ball on full shots may rise and the intended distance may not be achieved. On the other hand, when this value is too large, the durability of the ball to cracking on repeated impact may worsen, the initial velocity on shots may become lower or the spin rate on full shots may rise, as a result of which the intended distance may become unattainable.

The value obtained by subtracting the surface hardness of the envelope layer-encased sphere from the surface hardness of the intermediate layer-encased sphere, expressed on the Shore C hardness scale, is preferably 1 or more, more preferably 3 or more, and even more preferably 5 or more. The upper limit is preferably not more than 25, more preferably not more than 17, and even more preferably not more than 14. When this value falls outside of the above range, the spin rate of the ball on full shots may rise and the intended distance may become unattainable.

The value obtained by subtracting the surface hardness of the ball from the surface hardness of the intermediate layer-encased sphere, expressed on the Shore C hardness scale, is preferably 2 or more, more preferably 4 or more, and even more preferably 6 or more. The upper limit is preferably not more than 25, more preferably not more than 17, and even more preferably not more than 14. When this value is too small, the controllability of the ball in the short game may worsen. On the other hand, when this value is too large, the spin rate on full shots may rise, as a result of which the intended distance may become unattainable.

Initial Velocity Relationships Among Spheres

It is critical for the relationship among the initial velocity of the core, the initial velocity of the envelope layer-encased sphere, the initial velocity of the intermediate layer encased sphere and the initial velocity of the ball to satisfy the following three conditions:

(initial velocity of ball)<(initial velocity of intermediate layer-encased sphere), (initial velocity of intermediate layer-encased sphere)−(initial velocity of envelope layer-encased sphere)≤0.60 m/s, and 0.50≤(initial velocity of envelope layer-encased sphere)−(initial velocity of core)≤1.08 m/s.

By optimizing the initial velocity relationships among these spheres, the spin rate on full shots is held down, enabling the desired distance to be attained, and a good durability to cracking on repeated impact is achieved.

The value obtained by subtracting the initial velocity of the ball from the initial velocity of the intermediate layer-encased sphere is greater than 0 m/s, preferably 0.1 m/s or more, and more preferably 0.3 m/s or more. The upper limit is preferably not more than 1.0 m/s, more preferably not more than 0.7 m/s, and even more preferably not more than 0.5 m/s. When this value is too large, the spin rate of the ball on full shots may rise, the initial velocity on shots may decrease, and the intended distance may be unattainable. On the other hand, when this value is too small, in cases where the small value is due to the cover, the cover becomes hard and the ball is less receptive to spin in the short game, or the durability to cracking on repeated impact worsens. In cases where this small value is due to the intermediate layer, the spin rate of the ball on full shots may rise and the intended distance may be unattainable.

The value obtained by subtracting the initial velocity of the envelope layer-encased sphere from the initial velocity of the intermediate layer-encased sphere is preferably 0.10 m/s or more, more preferably 0.20 m/s or more, and even more preferably 0.30 m/s or more. The upper limit is preferably not more than 0.60 m/s, more preferably not more than 0.58 m/s, and even more preferably not more than 0.57 m/s. When this value is too large, in cases where this is due to the intermediate layer, the durability to cracking on repeated impact may worsen. In cases where this is due to the envelope layer, the spin rate on full shots may rise and the intended distance may be unattainable. When this value is too small, in cases where this is due to the intermediate layer, the spin rate may rise on full shots, as a result of which the intended distance may be unattainable. When this value is due to the envelope layer, the feel at impact may worsen or the durability to cracking on repeated impact may worsen.

The value obtained by subtracting the initial velocity of the core from the initial velocity of the envelope layer-encased sphere is 0.50 m/s or more, preferably 0.65 m/s or more, and more preferably 0.80 m/s or more. The upper limit is preferably not more than 1.08 m/s, more preferably not more than 1.07 m/s, and even more preferably not more than 1.06 m/s. When this value is too large, the durability to cracking on repeated impact may worsen. On the other hand, when this value is too small, the spin rate on full shots may rise and the intended distance may be unattainable.

The value obtained by subtracting the initial velocity of the core from the initial velocity of the intermediate layer-encased sphere is 0.80 m/s or more, preferably 1.00 m/s or more, and more preferably 1.20 m/s or more. The upper limit is preferably not more than 1.70 m/s, more preferably not more than 1.65 m/s, and even more preferably not more than 1.60 m/s. When this value is too large, the durability to cracking on repeated impact may worsen. On the other hand, when this value is too small, the spin rate on full shots may rise and the intended distance may be unattainable.

Specific Gravity Relationship Between Intermediate Layer and Cover

It is recommended that the difference between the specific gravity of the intermediate layer and the specific gravity of the cover be generally within ±0.15, preferably within ±0.10, and more preferably within ±0.05. That is, the value expressed as (specific gravity of cover)−(specific gravity of intermediate layer material) is generally equal to or more than −0.15, preferably equal to or more than −0.10, and more preferably equal to or more than −0.05. The upper limit is generally not more than 0.15, preferably not more than 0.10, and more preferably not more than 0.05. When the difference in the specific gravities of these layers is too large, in cases where the intermediate layer material and/or the cover material cannot be molded so as to be completely concentric with the layers positioned to the inside of these layers and end up being eccentric, significant wobbling of the ball may occur when struck with a putter.

Core Diameter and Ball Diameter

The relationship between the core diameter and the ball diameter, i.e., the value expressed as (core diameter)/(ball diameter), is preferably 0.820 or more, more preferably 0.824 or more, and even more preferably 0.828 or more. The upper limit is preferably not more than 0.970, more preferably not more than 0.920, and even more preferably not more than 0.900. When this value is too small, the ball initial velocity may become lower or the deflection of the overall ball may become smaller and the ball may become harder; also, the spin rate of the ball on full shots may rise, as a result of which the intended distance may be unattainable. On the other hand, when this value is too large, the spin rate on full shots may rise, making the intended distance unattainable, or the durability to cracking on repeated impact may worsen.

Numerous dimples may be formed on the outside surface of the cover. The number of dimples arranged on the cover surface, although not particularly limited, is preferably at least 250, more preferably at least 300, and even more preferably at least 320. The upper limit is preferably not more than 380, more preferably not more than 350, and even more preferably not more than 340. When the number of dimples is higher than this range, the ball trajectory may become lower and the distance traveled by the ball may decrease. On the other hand, when the number of dimples is lower that this range, the ball trajectory may become higher and a good distance may not be achieved.

The dimple shapes used may be of one type or may be a combination of two or more types suitably selected from among, for example, circular shapes, various polygonal shapes, dewdrop shapes and oval shapes. When circular dimples are used, the dimple diameter may be set to at least about 2.5 mm and up to about 6.5 mm, and the dimple depth may be set to at least 0.08 mm and up to 0.30 mm.

In order for the aerodynamic properties to be fully manifested, it is desirable for the dimple coverage ratio on the spherical surface of the golf ball, i.e., the dimple surface coverage SR, which is the sum of the individual dimple surface areas, each defined by the flat plane circumscribed by the edge of a dimple, as a percentage of the spherical surface area of the ball were the ball to have no dimples thereon, to be set to at least 70% and not more than 90%. Also, to optimize the ball trajectory, it is desirable for the value V0, defined as the spatial volume of the individual dimples below the flat plane circumscribed by the dimple edge, divided by the volume of the cylinder whose base is the flat plane and whose height is the maximum depth of the dimple from the base, to be set to at least 0.35 and not more than 0.80. Moreover, it is preferable for the ratio VR of the sum of the volumes of the individual dimples, each formed below the flat plane circumscribed by the edge of the dimple, with respect to the volume of the ball sphere were the ball surface to have no dimples thereon, to be set to at least 0.6% and not more than 1.0%. Outside of the above ranges in these respective values, the resulting trajectory may not enable a good distance to be achieved and so the ball may not travel a satisfactory distance.

The multi-piece solid golf ball of the invention can be made to conform to the Rules of Golf for play. The inventive ball may be formed to a diameter which is such that the ball does not pass through a ring having an inner diameter of 42.672 mm and to a weight which is preferably between 45.0 and 45.93 g.

EXAMPLES

The following Examples and Comparative Examples are provided to illustrate the invention, and are not intended to limit the scope thereof.

Examples 1 to 3, Comparative Examples 1 to 6

Formation of Core

In Example 3 and Comparative Examples 1 to 5, solid cores were produced by preparing rubber compositions for the respective examples shown in Table 1, and then molding and vulcanizing the compositions under the vulcanization conditions for each example shown in Table 1.

In Examples 1 and 2 and Comparative Example 6, the core is produced in the same way as above based on the formulations shown in Table 1.

Details on the above ingredients are provided below.
Polybutadiene: Available under the trade name "BR 730" from JSR Corporation
Zinc acrylate: "ZN-DA85S" from Nippon Shokubai Co., Ltd.
Organic Peroxide: Dicumyl peroxide, available under the trade name "Percumyl D" from NOF Corporation
Water: Pure water from Seiki Chemical Industrial Co., Ltd.
Antioxidant: 2,2'-Methylenebis(4-methyl-6-butylphenol), available under the trade name
"Nocrac NS-6" from Ouchi Shinko Chemical Industry Co., Ltd.
Zinc oxide: Available as Grade 3 Zinc Oxide from Sakai Chemical Co., Ltd.
Zinc salt of pentachlorothiophenol: Available from Wako Pure Chemical Industries, Ltd.

Formation of Envelope Layer, Intermediate Layer and Cover (Outermost Layer)

Next, in Example 3 and Comparative Examples 1 to 5, an envelope layer was formed by using an injection mold to injection-mold Resin Material No. 1 shown in Table 2 over the core surface. An intermediate layer was then formed by using a different injection mold to injection-mold Resin Materials No. 3 to 6 shown in Table 2 over the envelope layer-encased sphere. A cover (outermost layer) was then formed by using yet a different injection mold to injection-mold Resin Material No. 9 shown in Table 2 over the intermediate layer-encased sphere. Numerous dimples of a given configuration common to all of the Examples and Comparative Examples were formed at this time on the cover surface.

In Examples 1 and 2 and Comparative Example 6, an envelope layer is formed by using an injection mold to injection-mold Resin Material No. 1 or 2 shown in Table 2 over the core surface. An intermediate layer is then formed by using a different injection mold to injection-mold Resin Material No. 5 or 7 shown in Table 2 over the envelope layer-encased sphere. A cover (outermost layer) is then formed by using yet a different injection mold to injection-mold Resin Material No. 8 or 9 shown in Table 2 over the intermediate layer encased sphere. Numerous dimples of a given configuration common to all of the Examples and Comparative Examples are formed at this time on the cover surface.

TABLE 1

| | | Example | | | Comparative Example | | | | | |
|---|---|---|---|---|---|---|---|---|---|---|
| | | 1 | 2 | 3 | 1 | 2 | 3 | 4 | 5 | 6 |
| Core | Polybutadiene | 100 | 100 | 100 | 100 | 100 | 100 | 100 | 100 | 100 |
| formulation | Zinc acrylate | 33.7 | 32.7 | 31.7 | 31.7 | 29.7 | 33.7 | 29.7 | 31.7 | 35.0 |
| (pbw) | Organic peroxide | 0.6 | 0.6 | 0.6 | 0.6 | 0.6 | 0.6 | 0.6 | 0.6 | 1.0 |
| | Water | 0.8 | 0.8 | 0.8 | 0.8 | 0.8 | 0.8 | 0.8 | 0.8 | 0.8 |
| | Antioxidant | 0.1 | 0.1 | 0.1 | 0.1 | 0.1 | 0.1 | 0.1 | 0.1 | 0.1 |
| | Zinc oxide | 19.2 | 19.6 | 20.0 | 26.1 | 26.9 | 19.2 | 20.8 | 26.1 | 25.6 |
| | Zinc salt of pentachlorothiophenol | 0.7 | 0.7 | 0.7 | 0.7 | 0.7 | 0.7 | 0.7 | 0.7 | 1.0 |
| Vulcanization | Temperature (° C.) | 152 | 152 | 152 | 152 | 152 | 152 | 152 | 152 | 158 |
| conditions | Time (minutes) | 19 | 19 | 19 | 19 | 19 | 19 | 19 | 19 | 13 |

TABLE 2

| | Acid content (wt %) | Metal species | No. 1 | No. 2 | No. 3 | No. 4 | No. 5 | No. 6 | No. 7 | No. 8 | No. 9 |
|---|---|---|---|---|---|---|---|---|---|---|---|
| HPF™ 1000 | 12 | Mg | 100 | | | | | | 56 | | |
| Himilan ® 1605 | 15 | Na | | | | | | | 44 | | |
| Himilan ® 1557 | 12 | Zn | | | 15 | | 15 | | | | |
| Himilan ® 1706 | 15 | Zn | | | | 15 | | 15 | | | |
| AM 7318 | 18 | Na | | | 85 | 85 | 85 | 85 | | 75 | |
| AM 7327 | 7 | Zn | | | | | | | | 25 | |
| Titanium oxide | | | | | | | | | | 4 | 3 |
| Barium sulfate | | | | | | | 20 | 20 | | | |
| Trimethylolpropane | | | | | 1.1 | 1.1 | 1.1 | 1.1 | | | |
| Hytrel ® 4001 | | | | 100 | | | | | | | |
| TPU | | | | | | | | | | | 100 |

Trade names and other details on the compounding ingredients in the above table are given below.

HPF™ 1000: Available from The Dow Chemical Company

Himilan® 1605, Himilan® 1557, Himilan® 1706, AM 7318, AM 7327:

Ionomers available from Dow-Mitsui Polychemicals Co., Ltd.

Barium sulfate: Precipitated Barium Sulfate 300, available from Sakai Chemical Co., Ltd.

Trimethylolpropane (TMP): Available from Tokyo Chemical Industry Co., Ltd.

Hytrel® 4001: A polyester elastomer from DuPont-Toray Co., Ltd.

TPU: An ether-type thermoplastic polyurethane available under the trade name "Pandex" from DIC Covestro Polymer, Ltd.; material hardness (Shore D), 46

Various properties of the resulting golf balls, including the internal hardnesses of the core at various positions, the diameters of the core and each layer-encased sphere, the thickness and material hardness of each layer, the surface hardness of each layer-encased sphere and the initial velocity of each layer-encased sphere are evaluated by the following methods. The results are presented in Tables 3 and 4.

Core Hardness Profile

The indenter of a durometer is set substantially perpendicular to the spherical surface of the core and the surface hardness on the Shore C hardness scale is measured in accordance with ASTM D2240. The hardnesses at the center and specific positions of the core are measured as Shore C hardness values by perpendicularly pressing the indenter of a durometer against the center portion and the specific positions shown in Table 3 on the flat cross-section obtained by cutting the core into hemispheres. The P2 Automatic Rubber Hardness Tester (Kobunshi Keiki Co., Ltd.) equipped with a Shore C durometer can be used for measuring the hardness. The maximum value is read off as the hardness value. Measurements are all carried out in a 23±2° C. environment. The numbers in the table are Shore C hardness values.

Also, in the core hardness profile, letting Cc be the Shore C hardness at the center of the core, Cs be the Shore C hardness at the core surface, Cm be the Shore C hardness at the midpoint M between the core center and core surface, Cm−2, Cm−4 and Cm−6 be the respective Shore C hardnesses at positions 2 mm, 4 mm and 6 mm inward from the midpoint M and Cm+2, Cm+4 and Cm+6 be the respective Shore C hardnesses at positions 2 mm, 4 mm and 6 mm outward from the midpoint M, the surface areas A to F defined as follows surface area A: ½×2×(Cm−4−Cm−6)
surface area B: ½×2×(Cm−2−Cm−4)
surface area C: ½×2×(Cm−Cm−2)
surface area D: ½×2×(Cm+2−Cm)
surface area E: ½×2×(Cm+4−Cm+2)
surface area F: ½×2×(Cm+6−Cm+4)

are calculated, and the values of the following six expressions are determined.

(1) surface areas A+B
(2) surface area B+C
(3) surface areas D+E
(4) surface areas E+F
(5) (surface areas E+F)−(surface areas A+B)
(6) (surface areas D+E)−(surface areas B+C)

Surface areas A to F in the core hardness profile are explained in FIG. 2, which is a graph plotted using the core hardness profile data from Example 1.

Figure 3:
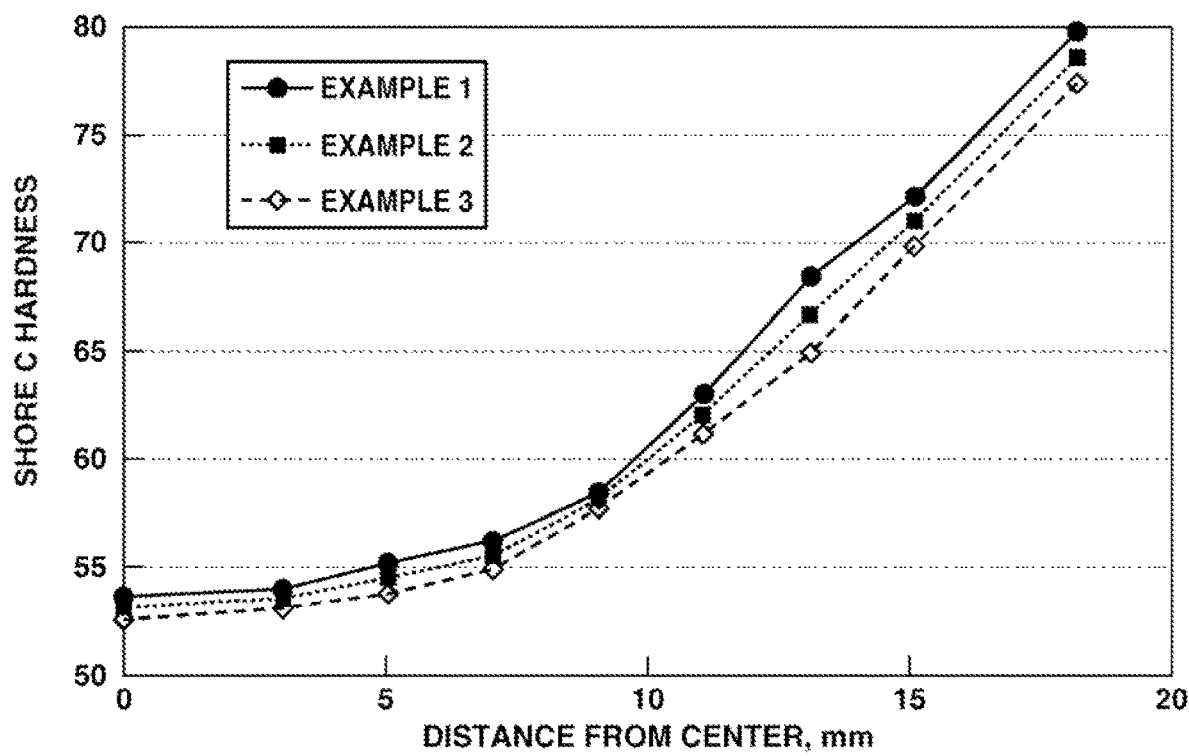
FIG. 3 is a graph showing the core hardness profiles in Examples 1 to 3.

FIGS. 3 and 4 show graphs of the core hardness profiles for Examples 1 to 3 and Comparative Examples 1 to 6.

Diameters of Core, Envelope Layer-Encased Sphere and Intermediate Layer-Encased Sphere The spheres to be measured are held isothermally for at least 3 hours in a thermostatic chamber adjusted to 23.9±1° C., following which they are measured in a 23.9±2° C. room. The diameters at five random places on the surface of each sphere are measured. Using the average of these measurements as the measured value for a single sphere, the average diameter for ten such spheres is determined.

Ball Diameter

The balls to be measured are held isothermally for at least 3 hours in a thermostatic chamber adjusted to 23.9±1° C., following which they are measured in a 23.9±2° C. room. The diameters at 15 random dimple-free areas on each ball are measured. Using the average of these 15 measurements as the measured value for a single ball, the average diameter for ten balls is determined.

Deflections of Core, Envelope Layer-Encased Sphere, Intermediate Layer-Encased Sphere and Ball The core, envelope layer-encased sphere, intermediate layer-encased sphere or ball is placed on a hard plate and the amount of deflection when compressed under a final load of 1,275 N (130 kgf) from an initial load of 98 N (10 kgf) is measured. The amount of deflection is the measured value obtained by measurement in a 23.9±2° C. room after holding the sphere isothermally for at least 3 hours in a thermostatic chamber adjusted to 23.9±1° C. The rate at which pressure is applied by the head which compresses the core, the layer-encased sphere or the ball is set to 10 mm/s.

Material Hardnesses (Shore C and Shore D Hardnesses) of Envelope Layer, Intermediate Layer and Cover The resin material for each layer is molded into a sheet having a thickness of 2 mm and left to stand at a temperature of 23±2° C. for at least two weeks. Three sheets are stacked together at the time of measurement. The Shore C hardness and Shore D hardness of each material are measured with Shore C and Shore D durometers that conform to ASTM D2240. A P2 Automatic Rubber Hardness Tester (Kobunshi Keiki Co., Ltd.) having mounted thereon a Shore C durometer or a Shore D durometer can be used for measuring the hardnesses. The maximum value is read off as the hardness value.

Surface Hardnesses of Envelope Layer-Encased Sphere, Intermediate Layer-Encased Sphere and Ball These hardnesses are measured by perpendicularly pressing an indenter against the surfaces of the respective spheres. The surface hardness of a ball (cover) is the value measured at a dimple-free area (land) on the surface of the ball. The Shore C hardness and Shore D hardness at the surface of each sphere are measured with Shore C and Shore D durometers that conform to ASTM D2240. A P2 Automatic Rubber Hardness Tester (Kobunshi Keiki Co., Ltd.) having mounted thereon a Shore C durometer or a Shore D durometer can be used for measuring the hardnesses. The maximum value is read off as the hardness value.

Initial Velocities of the Spheres

The initial velocities of the respective spheres are measured as follows using a COR initial velocity tester custom-designed and built by Hye Precision Products according to R&A protocols.

The air pressure is changed in four stages—35.5, 36.5, 39.5 and 40.5 psi—and the sphere is fired at four inbound velocities by means of the respective air pressures and made to collide with a barrier, and the coefficient of restitution (COR) is measured. That is, the relationship between the inbound velocity and the COR is established by changing the air pressure in four stages. A correlation formula between the inbound velocity and the contact time is similarly established.

From these correlation formulas, the COR and the contact time ($\mu s$) at an inbound velocity of 43.83 m/s are determined and inserted into the following initial velocity conversion formula to compute the initial velocities of the respective spheres.

$$IV = 136.8 + 136.3e + 0.019tc$$

Here, e is the coefficient of restitution and tc is the contact time ($\mu s$) at an impact velocity of 143.8 ft/s (43.83 m/s).

In measurement of the initial velocities of the spheres, the inside diameter of the barrel used is 36.58 mm for the core, 41.53 mm for the intermediate layer-encased sphere and 43.18 mm for the ball. The inside diameter of the barrel used for the envelope layer encased sphere is 39.88 mm in Examples 1 to 3 and Comparative Examples 1 to 6, and is 38.23 mm in Comparative Example 7.

TABLE 3

| | | Example | | | Comparative Example | | | | | |
|---|---|---|---|---|---|---|---|---|---|---|
| | | 1 | 2 | 3 | 1 | 2 | 3 | 4 | 5 | 6 |
| Core | Construction (piece) | 4P | 4P | 4P | 4P | 4P | 4P | 4P | 4P | 4P |
| | Diameter (mm) | 36.29 | 36.28 | 36.27 | 36.27 | 36.27 | 36.29 | 36.25 | 36.27 | 35.2 |
| | Weight (g) | 29.3 | 29.3 | 29.3 | 30.2 | 30.2 | 29.3 | 29.3 | 30.2 | 27.8 |
| | Specific gravity | 1.17 | 1.17 | 1.17 | 1.21 | 1.21 | 1.17 | 1.17 | 1.21 | 1.22 |
| | Deflection (mm) | 4.5 | 4.7 | 4.8 | 4.7 | 5.1 | 4.5 | 5.3 | 4.7 | 4.6 |
| | Initial velocity (m/s) | 76.33 | 76.27 | 76.22 | 75.99 | 75.99 | 76.33 | 76.17 | 75.99 | 76.19 |
| Core hardness profile | Cs (Shore C) | 79.8 | 78.6 | 77.4 | 76.9 | 74.4 | 79.8 | 74.0 | 76.9 | 78.8 |
| | Cm + 6 (Shore C) | 72.1 | 71.0 | 69.8 | 69.9 | 66.5 | 72.1 | 66.3 | 69.9 | 74.1 |
| | Cm + 4 (Shore C) | 68.4 | 66.7 | 64.9 | 66.5 | 63.5 | 68.4 | 63.3 | 66.5 | 71.1 |
| | Cm + 2 (Shore C) | 62.9 | 62.0 | 61.1 | 62.5 | 60.3 | 62.9 | 59.6 | 62.5 | 66.9 |
| | Cm (Shore C) | 58.4 | 58.1 | 57.7 | 60.8 | 59.1 | 58.4 | 56.0 | 60.8 | 63.0 |
| | Cm − 2 (Shore C) | 56.1 | 55.5 | 54.8 | 56.0 | 55.3 | 56.1 | 53.3 | 56.0 | 60.7 |
| | Cm − 4 (Shore C) | 55.1 | 54.4 | 53.7 | 54.0 | 52.8 | 55.1 | 52.0 | 54.0 | 59.6 |
| | Cm − 6 (Shore C) | 53.9 | 53.5 | 53.0 | 53.2 | 51.9 | 53.9 | 51.3 | 53.2 | 58.4 |
| | Cc (Shore C) | 53.5 | 53.0 | 52.5 | 53.3 | 51.6 | 53.5 | 50.7 | 53.3 | 57.2 |
| | Cs − Cc (Shore C) | 26.3 | 25.6 | 24.9 | 23.6 | 22.8 | 26.3 | 23.3 | 23.6 | 21.6 |
| | (Cs − Cc)/(Cm − Cc) | 5.4 | 5.0 | 4.8 | 3.1 | 3.0 | 5.4 | 4.4 | 3.1 | 3.7 |
| | Surface area A  ½ × 2 × (Cm − 4 − Cm − 6) | 1.2 | 0.9 | 0.7 | 0.8 | 0.9 | 1.2 | 0.7 | 0.8 | 1.2 |
| | Surface area B  ½ × 2 × (Cm − 2 − Cm − 4) | 1.0 | 1.1 | 1.1 | 2.0 | 2.5 | 1.0 | 1.3 | 2.0 | 1.1 |
| | Surface area C  ½ × 2 × (Cm − Cm − 2) | 2.3 | 2.6 | 2.9 | 4.8 | 3.8 | 2.3 | 2.7 | 4.8 | 2.3 |
| | Surface area D  ½ × 2 × (Cm + 2 − Cm) | 4.5 | 3.9 | 3.4 | 1.7 | 1.2 | 4.5 | 3.6 | 1.7 | 3.9 |
| | Surface area E  ½ × 2 × (Cm + 4 − Cm + 2) | 5.5 | 4.7 | 3.8 | 4.0 | 3.2 | 5.5 | 3.7 | 4.0 | 4.2 |
| | Surface area F  ½ × 2 × (Cm + 6 − Cm + 4) | 3.7 | 4.3 | 4.9 | 3.4 | 3.0 | 3.7 | 3.0 | 3.4 | 3.0 |
| | Surface area E + Surface area F | 9.2 | 9.0 | 8.7 | 7.4 | 6.2 | 9.2 | 6.7 | 7.4 | 7.2 |
| | (Surface areas E + F) − (Surface areas A + B) | 7.0 | 7.0 | 6.9 | 4.6 | 2.8 | 7.0 | 4.7 | 4.6 | 4.9 |
| | (Surface areas D + E) − (Surface areas B + C) | 6.7 | 4.9 | 3.2 | −1.1 | −1.9 | 6.7 | 3.3 | −1.1 | 4.7 |

TABLE 4

|  |  | Example | | | Comparative Example | | | | | |
| --- | --- | --- | --- | --- | --- | --- | --- | --- | --- | --- |
|  |  | 1 | 2 | 3 | 1 | 2 | 3 | 4 | 5 | 6 |
| Envelope layer | Material | No. 1 | No. 1 | No. 1 | No. 1 | No. 1 | No. 1 | No. 1 | No. 1 | No. 2 |
|  | Thickness (mm) | 1.32 | 1.32 | 1.32 | 1.32 | 1.32 | 1.32 | 1.33 | 1.32 | 1.24 |
|  | Specific gravity | 0.96 | 0.96 | 0.96 | 0.96 | 0.96 | 0.96 | 0.96 | 0.96 | 1.12 |
|  | Material hardness (Shore C) | 85 | 85 | 85 | 85 | 85 | 85 | 85 | 85 | 67 |
|  | Material hardness (Shore D) | 55 | 55 | 55 | 55 | 55 | 55 | 55 | 55 | 40 |
| Envelope layer-encased sphere | Diameter (mm) | 38.93 | 38.92 | 38.91 | 38.91 | 38.91 | 38.93 | 38.90 | 38.91 | 37.68 |
|  | Weight (g) | 34.9 | 34.9 | 34.9 | 35.8 | 35.8 | 34.9 | 34.8 | 35.8 | 33.5 |
|  | Deflection (mm) | 4.0 | 4.2 | 4.3 | 4.2 | 4.6 | 4.0 | 4.7 | 4.2 | 4.3 |
|  | Initial velocity (m/s) | 77.26 | 77.27 | 77.28 | 77.08 | 77.02 | 77.25 | 77.19 | 77.08 | 76.23 |
|  | Surface hardness (Shore C) | 89 | 89 | 89 | 89 | 89 | 89 | 89 | 89 | 72 |
|  | Surface hardness (Shore D) | 57 | 57 | 57 | 57 | 57 | 57 | 57 | 57 | 47 |
|  | Envelope layer surface hardness − Core center hardness (Shore C) | 36 | 36 | 37 | 36 | 37 | 36 | 38 | 36 | 15 |
|  | Envelope layer surface hardness − Core surface hardness (Shore C) | 9 | 10 | 12 | 12 | 15 | 9 | 15 | 12 | −7 |
| Intermediate layer | Material | No. 5 | No. 5 | No. 5 | No. 4 | No. 4 | No. 6 | No. 6 | No. 3 | No. 7 |
|  | Thickness (mm) | 1.07 | 1.07 | 1.08 | 1.07 | 1.08 | 1.05 | 1.08 | 1.06 | 1.30 |
|  | Specific gravity | 1.09 | 1.09 | 1.09 | 0.95 | 0.95 | 1.10 | 1.10 | 0.95 | 0.95 |
|  | Material hardness (Shore C) | 95 | 95 | 95 | 94 | 94 | 95 | 95 | 94 | 86 |
|  | Material hardness (Shore D) | 69 | 69 | 69 | 67 | 67 | 68 | 68 | 66 | 57 |
| Intermediate layer-encased sphere | Diameter (mm) | 41.06 | 41.06 | 41.06 | 41.06 | 41.08 | 41.03 | 41.06 | 41.03 | 40.28 |
|  | Weight (g) | 40.7 | 40.7 | 40.7 | 40.9 | 40.9 | 40.7 | 40.7 | 40.8 | 39.4 |
|  | Deflection (mm) | 3.4 | 3.5 | 3.6 | 3.5 | 3.7 | 3.3 | 3.8 | 3.5 | 3.7 |
|  | Initial velocity (m/s) | 77.83 | 77.82 | 77.81 | 77.70 | 77.88 | 77.86 | 77.92 | 77.69 | 76.95 |
|  | Surface hardness (Shore C) | 97 | 97 | 97 | 97 | 97 | 97 | 98 | 97 | 93 |
|  | Surface hardness (Shore D) | 71 | 71 | 71 | 72 | 71 | 72 | 71 | 71 | 63 |
|  | Intermediate layer surface hardness − Core center hardness (Shore C) | 44 | 44 | 45 | 44 | 45 | 44 | 47 | 44 | 36 |
|  | Intermediate layer surface hardness − Envelope layer surface hardness (Shore C) | 8 | 8 | 8 | 8 | 8 | 8 | 9 | 8 | 21 |
|  | Envelope layer thickness − Intermediate layer thickness (mm) | 0.25 | 0.25 | 0.24 | 0.25 | 0.24 | 0.27 | 0.25 | 0.26 | −0.06 |
| Cover | Material | No. 9 | No. 9 | No. 9 | No. 9 | No. 9 | No. 9 | No. 9 | No. 9 | No. 8 |
|  | Thickness (mm) | 0.83 | 0.83 | 0.83 | 0.83 | 0.81 | 0.84 | 0.83 | 0.84 | 1.20 |
|  | Specific gravity | 1.12 | 1.12 | 1.12 | 1.12 | 1.12 | 1.12 | 1.12 | 1.12 | 0.97 |
|  | Material hardness (Shore C) | 66 | 66 | 66 | 66 | 66 | 66 | 66 | 66 | 96 |
|  | Material hardness (Shore D) | 46 | 46 | 46 | 46 | 46 | 46 | 46 | 46 | 64 |
| Ball | Diameter (mm) | 42.72 | 42.72 | 42.72 | 42.71 | 42.70 | 42.72 | 42.71 | 42.70 | 42.68 |
|  | Weight (g) | 45.5 | 45.5 | 45.5 | 45.6 | 45.6 | 45.5 | 45.5 | 45.6 | 45.3 |
|  | Deflection (mm) | 3.1 | 3.2 | 3.3 | 3.2 | 3.5 | 3.1 | 3.5 | 3.3 | 3.2 |
|  | Initial velocity (m/s) | 77.35 | 77.36 | 77.37 | 77.48 | 77.50 | 77.45 | 77.45 | 77.37 | 77.19 |
|  | Surface hardness (Shore C) | 85 | 85 | 85 | 85 | 86 | 86 | 85 | 85 | 97 |
|  | Surface hardness (Shore D) | 58 | 58 | 58 | 59 | 58 | 60 | 59 | 59 | 68 |
|  | Intermediate layer surface hardness − Ball surface hardness (Shore C) | 13 | 13 | 13 | 12 | 11 | 12 | 13 | 12 | −4 |
|  | Core diameter/Ball diameter | 0.849 | 0.849 | 0.849 | 0.849 | 0.849 | 0.849 | 0.849 | 0.849 | 0.825 |
|  | Intermediate layer thickness − Cover thickness (mm) | 0.24 | 0.24 | 0.25 | 0.25 | 0.27 | 0.21 | 0.25 | 0.22 | 0.10 |
|  | Cover material specific gravity − Intermediate layer specific gravity | 0.03 | 0.03 | 0.03 | 0.17 | 0.17 | 0.02 | 0.02 | 0.17 | 0.97 |
| Initial velocity relationships | Intermediate layer-encased sphere − Ball (m/s) | 0.48 | 0.46 | 0.44 | 0.22 | 0.38 | 0.41 | 0.47 | 0.32 | −0.24 |
|  | Intermediate layer-encased sphere − Envelope layer-encased sphere (m/s) | 0.57 | 0.55 | 0.53 | 0.62 | 0.86 | 0.61 | 0.73 | 0.61 | 0.72 |
|  | Envelope layer-encased sphere − Core (m/s) | 0.93 | 1.00 | 1.06 | 1.09 | 1.03 | 0.92 | 1.02 | 1.09 | 0.04 |
|  | Intermediate layer-encased sphere − Core (m/s) | 1.50 | 1.55 | 1.59 | 1.71 | 1.89 | 1.53 | 1.75 | 1.70 | 0.76 |

The flight (utility club, I #6 and I #8), controllability on approach shots, feel at impact and durability to repeated impact of each golf ball are evaluated by the following methods. The results are shown in Table 5.

Evaluation of Flight (Utility Club)

A utility club is mounted on a golf swing robot and the spin rate and total distance traveled by the ball when struck at a head speed (HS) of 38 m/s are measured. The club used is the JGR H2 (2016 model) manufactured by Bridgestone Sports Co., Ltd.

Rating Criteria
  Good: Total distance is 166.0 m or more
  NG: Total distance is less than 166.0 m Evaluation of Flight (I #6)

A number six iron (I #6) is mounted on a golf swing robot and the spin rate and total distance traveled by the ball when struck at a head speed of 35 m/s are measured. The club used is the JGR Forged I #6 (2016 model) manufactured by Bridgestone Sports Co., Ltd.

Rating Criteria
  Good: Total distance is 149.0 m or more
  NG: Total distance is less than 149.0 m Evaluation of Flight (I #8)

A number eight iron (I #8) is mounted on a golf swing robot and the spin rate and total distance traveled by the ball when struck at a head speed of 35 m/s are measured. The club used is the JGR Forged I #8 (2016 model) manufactured by Bridgestone Sports Co., Ltd.

Rating Criteria
  Good: Total distance is 122.0 m or more
  NG: Total distance is less than 122.0 m Evaluation of Spin Rate on Approach Shots A sand wedge is mounted on a golf swing robot and the amount of spin by the ball when struck at a head speed of 15 m/s is rated according to the criteria shown below. The spin rate is measured with a launch monitor immediately after the ball has been struck. The sand wedge used is the TourStage TW-03 (loft angle, 57°; 2002 model) manufactured by Bridgestone Sports Co., Ltd.

Rating Criteria:
  Good: Spin rate is 4,500 rpm or more
  NG: Spin rate is less than 4,500 rpm Feel The feel of the ball when struck with a driver (W #1) by amateur golfers having a head speed of 30 to 40 m/s is rated in terms of the number of golfers rating the ball as having a "good, soft feel."

Rating Criteria:
  Good: Seven or more out of 10 golfers
  NG: Six or fewer out of 10 golfers Durability to Cracking on Repeated Impact The durability of the golf ball is evaluated using an ADC Ball COR Durability Tester manufactured by Automated Design Corporation (U.S.A.). This tester fires a golf ball pneumatically and causes it to consecutively strike two metal plates arranged in parallel. The average number of shots required for the golf ball to crack is treated as the durability. Here, the average number of shots is obtained by furnishing ten balls of the same type for testing, firing each ball, and averaging the number of shots required for each of the ten balls to crack. The type of tester used is a horizontal COR tester, and the incident velocity against the metal plates is set to 43 m/s.

Evaluation Criteria
  Good: Average number of shots is 135 times or more
  NG: Average number of shots is 134 times or less

TABLE 5

| | | | Example | | | Comparative Example | | | | | |
|---|---|---|---|---|---|---|---|---|---|---|---|
| | | | 1 | 2 | 3 | 1 | 2 | 3 | 4 | 5 | 6 |
| Flight | Utility club | Spin rate (rpm) | 4,195 | 4,176 | 4,157 | 4,071 | 4,060 | 4,209 | 4,056 | 4,113 | 4,178 |
| | HS: 38 m/s | Total distance (m) | 166.8 | 166.6 | 166.4 | 169.2 | 168.0 | 165.6 | 167.2 | 165.3 | 168.9 |
| | | Rating | good | good | good | good | good | NG | good | NG | good |
| | I#6 | Spin rate (rpm) | 4,584 | 4,527 | 4,470 | 4,497 | 4,331 | 4,578 | 4,314 | 4,468 | 4,933 |
| | HS: 35 m/s | Total distance (m) | 149.7 | 149.8 | 149.9 | 150.9 | 151.5 | 151.1 | 151.0 | 151.1 | 147.2 |
| | | Rating | good | good | good | good | good | good | good | good | NG |
| | I#8 | Spin rate (rpm) | 5,944 | 5,887 | 5,830 | 5,873 | 5,747 | 5,981 | 5,665 | 5,932 | 6,592 |
| | HS: 35 m/s | Total distance (m) | 122.8 | 122.6 | 122.3 | 121.9 | 123.7 | 123.8 | 124.3 | 122.1 | 120.1 |
| | | Rating | good | good | good | NG | good | good | good | good | NG |
| Approach shots | Sand wedge HS: 15 m/s | Spin rate (rpm) | 4,654 | 4,652 | 4,651 | 4,673 | 4,557 | 4,684 | 4,598 | 4,694 | 3,807 |
| | | Rating | good | good | good | good | good | good | good | good | NG |
| Feel at impact | | Rating | good | good | good | good | good | good | good | good | good |
| Durability to cracking on repeated impact | | No. of shots until ball cracked | 190 | 174 | 158 | 108 | 95 | 131 | 93 | 117 | 134 |
| | | Rating | good | good | good | NG | NG | good | NG | NG | good |

In Comparative Example 1, the value of (initial velocity of intermediate layer-encased sphere−initial velocity of envelope layer-encased sphere) is larger than 0.60 m/s and the value of (initial velocity of envelope layer-encased sphere−initial velocity of core) is larger than 1.08 m/s. As a result, the distance traveled by the ball on shots with an iron (I #8) is inferior and the durability of the ball to cracking on repeated impact is poor.

In Comparative Example 2, the value of (initial velocity of intermediate layer-encased sphere−initial velocity of envelope layer-encased sphere) is larger than 0.60 m/s. As a result, the durability of the ball to cracking on repeated impact is poor.

In Comparative Example 3, the value of (initial velocity of intermediate layer-encased sphere−initial velocity of envelope layer-encased sphere) is larger than 0.60 m/s. As a result, the distance traveled by the ball on shots with a utility club is inferior.

In Comparative Example 4, the value of (initial velocity of intermediate layer-encased sphere−initial velocity of envelope layer-encased sphere) is larger than 0.60 m/s. As a result, the durability of the ball to cracking on repeated impact is poor.

In Comparative Example 5, the value of (initial velocity of intermediate layer-encased sphere−initial velocity of envelope layer-encased sphere) is larger than 0.60 m/s and the value of (initial velocity of envelope layer-encased sphere−initial velocity of core) is larger than 1.08 m/s. As a result, the distance traveled by the ball on shots with a utility club is inferior and the durability of the ball to cracking on repeated impact is poor.

In Comparative Example 6, the initial velocity of the ball is lower than the initial velocity of the intermediate layer-encased sphere, the value of (initial velocity of intermediate layer-encased sphere−initial velocity of envelope layer-encased sphere) is larger than 0.60 m/s and the value of (initial velocity of envelope layer-encased sphere−initial velocity of core) is larger than 1.08 m/s. As a result, the distances traveled by the ball on shots with the irons (I #6 and I #8) are inferior, in addition to which the spin rate of the ball on approach shots decreases, resulting in a poor inferior controllability in the short game.

Japanese Patent Application No. 2022-114563 is incorporated herein by reference. Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising a core of one or more layer, one or more envelope layer, a single intermediate layer and a single-layer cover, wherein the core is formed of a rubber composition, the envelope layer, the intermediate layer and the cover are each formed of a resin composition, and the core has an initial velocity, the envelope layer-encased sphere obtained by encasing the core with the envelope layer has an initial velocity, the intermediate layer-encased sphere obtained by encasing the envelope layer encased sphere with the intermediate layer has an initial velocity and the ball obtained by encasing the intermediate layer-encased sphere with the cover has an initial velocity which together satisfy the following three conditions:

(initial velocity of ball)<(initial velocity of intermediate layer-encased sphere), (initial velocity of intermediate layer-encased sphere)−(initial velocity of envelope layer-encased sphere)≤0.60 m/s, and 0.50≤(initial velocity of envelope layer-encased sphere)−(initial velocity of core)≤1.08 m/s, and wherein the ball satisfies the following condition:
Shore C surface hardness of ball <Shore C surface hardness of intermediate layer encased sphere >Shore C surface hardness of envelope layer-encased sphere >Shore C surface hardness of core.

2. The golf ball of claim 1, wherein the resin composition of the intermediate layer includes a high-acid ionomer resin having an acid content of 16 wt % or more.

3. The golf ball of claim 1, wherein the intermediate layer has a specific gravity of 1.05 or more.

4. The golf ball of claim 1, wherein the intermediate layer includes a granular inorganic filler.

5. The golf ball of claim 1, wherein the cover and the intermediate layer have respective specific gravities with a difference therebetween of not more than 0.15.

6. The golf ball of claim 1, wherein the ball satisfies the following condition:
thickness of cover <thickness of intermediate layer≤thickness of envelope layer.

7. The golf ball of claim 1, wherein the core has a diameter of from 35.1 to 41.3 mm.

8. The golf ball of claim 1, wherein the core has a hardness profile in which, letting Cc be the Shore C hardness at a center of the core, Cs be the Shore C hardness at a surface of the core, Cm be the Shore C hardness at a midpoint M between the core center and the core surface, Cm−2, Cm−4 and Cm−6 be the respective Shore C hardnesses at positions 2 mm, 4 mm and 6 mm inward from the midpoint M and Cm+2, Cm+4 and Cm+6 be the respective Shore C hardnesses at positions 2 mm, 4 mm and 6 mm outward from the midpoint M, and defining surface areas A to F as follows
surface area A: ½×2× (Cm−4−Cm−6)
surface area B: ½×2× (Cm−2−Cm−4)
surface area C: ½×2× (Cm−Cm−2)
surface area D: ½×2× (Cm+2−Cm)
surface area E: ½×2× (Cm+4−Cm+2)
surface area F: ½×2× (Cm+6−Cm+4), the core satisfies the condition:
(surface area E+surface area F)−(surface area A+surface area B)≥1.0.

9. The golf ball of claim 1, wherein the ball satisfies the following condition:
1.00≤(initial velocity of intermediate layer-encased sphere)−(initial velocity of core)≤1.65 m/s.

10. A multi-piece solid golf ball comprising a core of one or more layer, one or more envelope layer, a single intermediate layer and a single-layer cover, wherein the core is formed of a rubber composition, the envelope layer, the intermediate layer and the cover are each formed of a resin composition, and the core has an initial velocity, the envelope layer-encased sphere obtained by encasing the core with the envelope layer has an initial velocity, the intermediate layer-encased sphere obtained by encasing the envelope layer encased sphere with the intermediate layer has an initial velocity and the ball obtained by encasing the intermediate layer-encased sphere with the cover has an initial velocity which together satisfy the following three conditions:

(initial velocity of ball)<(initial velocity of intermediate layer-encased sphere), (initial velocity of intermediate layer-encased sphere)−(initial velocity of envelope layer-encased sphere)≤0.60 m/s, and 0.50≤(initial velocity of envelope layer-encased sphere)−(initial velocity of core)≤1.08 m/s, and wherein the core has a hardness profile in which, letting Cc be the Shore C hardness at a center of the core, Cs be the Shore C hardness at a surface of the core, Cm be the Shore C hardness at a midpoint M between the core center and the core surface, Cm−2, Cm−4 and Cm−6 be the respective Shore C hardnesses at positions 2 mm, 4 mm and 6 mm inward from the midpoint M and Cm+2, Cm+4 and Cm+6 be the respective Shore C hardnesses at positions 2 mm, 4 mm and 6 mm outward from the midpoint M, and defining surface areas A to F as follows surface area A: ½×2× (Cm−4−Cm−6)
surface area B: ½×2× (Cm−2−Cm−4)
surface area C: ½×2× (Cm−Cm−2)
surface area D: ½×2× (Cm+2−Cm)
surface area E: ½×2× (Cm+4−Cm+2)
surface area F: ½×2× (Cm+6−Cm+4), the core satisfies the condition:
(surface area E+surface area F)−(surface area A+surface area B)≥1.0.

11. The golf ball of claim 10, wherein the core has a diameter of from 35.1 to 41.3 mm.

* * * * *